(12) United States Patent
Miyata et al.

(10) Patent No.: US 7,609,717 B2
(45) Date of Patent: Oct. 27, 2009

(54) PACKET TRANSFER APPARATUS PERFORMING ADDRESS TRANSLATION

(75) Inventors: Hiroaki Miyata, Yokohama (JP); Atsushi Tachikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1118 days.

(21) Appl. No.: 10/346,139

(22) Filed: Jan. 17, 2003

(65) Prior Publication Data

US 2003/0219023 A1   Nov. 27, 2003

(30) Foreign Application Priority Data

May 24, 2002   (JP) .............................. 2002-150362

(51) Int. Cl.
*H04J 3/22* (2006.01)
(52) U.S. Cl. ...................... 370/466; 370/401
(58) Field of Classification Search ................ 370/466, 370/474, 401, 467
See application file for complete search history.

(56) References Cited

U.S. PATENT DOCUMENTS

| | | | | |
|---|---|---|---|---|
| 4,628,311 A | * | 12/1986 | Milling | 370/447 |
| 5,107,417 A | * | 4/1992 | Yokoyama | 711/206 |
| 5,130,984 A | * | 7/1992 | Cisneros | 370/399 |
| 5,179,552 A | * | 1/1993 | Chao | 370/427 |
| 6,038,233 A | * | 3/2000 | Hamamoto et al. | 370/401 |
| 6,044,080 A | * | 3/2000 | Antonov | 370/401 |
| 6,118,784 A | * | 9/2000 | Tsuchiya et al. | 370/401 |
| 6,243,394 B1 | * | 6/2001 | Deng | 370/466 |
| 6,259,706 B1 | * | 7/2001 | Shimada | 370/466 |
| 2001/0033581 A1 | * | 10/2001 | Kawarai et al. | 370/468 |
| 2001/0038607 A1 | * | 11/2001 | Honda | 370/218 |

FOREIGN PATENT DOCUMENTS

| | | |
|---|---|---|
| JP | 11-252172 | 9/1999 |
| JP | 2000-183874 | 6/2000 |
| JP | 2001-28606 | 1/2001 |
| JP | 2001-274845 | 10/2001 |
| JP | 2001-285357 | 10/2001 |
| JP | 2001-285366 | 10/2001 |

* cited by examiner

*Primary Examiner*—Kwang B Yao
*Assistant Examiner*—Andrew Lai
(74) *Attorney, Agent, or Firm*—Mattingly & Malur, P.C.

(57) ABSTRACT

A packet transfer apparatus having a plurality of protocol processing units 10 and a switch 20 for switching IP packets among the protocol processing units, wherein a protocol processing unit connected to an IPv4 network includes: input-side address translator CNv6 (I) for translating the address of an input packet to an IPv6 address; output-side address translator CNv4 (O) for translating, when an IPv6 packet is received from the switch, the address to an IPv4 address and transferring the resultant packet to the IPv4 network; and an operation mode controller for omitting address translation by the input-side address translator.

10 Claims, 24 Drawing Sheets

FIG. 5

IPv4/IPv6 TRANSLATION TABLE 166

| 1660 | 1661a | 1662a | 1663a | 1661b | 1662b | 1663b | |
|---|---|---|---|---|---|---|---|
| ENTRY NUMBER | IPv4 ADDRESS | VIRTUAL IPv4 ADDRESS FOR IPv6 TERMINAL | IPv4 NETWORK ID | VIRTUAL IPv6 ADDRESS FOR IPv4 TERMINAL | IPv6 ADDRESS | IPv6 NETWORK ID | |
| 1 | 192.168.10.10 | 192.168.10.210 | NW-2 | 100F::230 | 100F::30 | NW-4 | ~ E61 |
| 2 | 200.10.0.10 | 200.10.40.210 | NW-3 | 4FFF::210 | 3FFF::1 | NW-n | ~ E62 |
| 3 | 192.168.10.10 | 192.168.10.110 | NW-1 | 1111::10 | 2222::210 | 1 | ~ E63a |
| 4 | 192.168.10.40 | 192.168.10.240 | NW-2 | 2222::210 | 1111::10 | 1 | ~ E63b |
| 5 | ... | ... | | ... | ... | | |
| | IPv4 INFORMATION FIELD 166A | | | IPv6 INFORMATION FIELD 166B | | | |

FIG. 6

IPv4 ROUTING TABLE 165

| ENTRY NUMBER (1650) | NETWORK ADDRESS (1651) | NEXT HOP ADDRESS (1652) | OUTPUT PORT NUMBER (1653) | LINE INTERFACE NUMBER (1654) | IPv4 NETWORK ID (1655) |
|---|---|---|---|---|---|
| 1 | 192.168.10 | 192.168.10.254 | 2 | 2 | NW-2 |
| 2 | 200.10.0 | 200.10.0.254 | 3 | 3 | NW-3 |
| 3 | 192.168.10 | 192.168.10.255 | 1 | 1 | NW-1 |
| ⋮ | ⋮ | ⋮ | ⋮ | ⋮ | ⋮ |

FIG. 7

IPv6 ROUTING TABLE 164

| ENTRY NUMBER (1640) | NETWORK ADDRESS (1641) | NEXT HOP ADDRESS (1642) | OUTPUT PORT NUMBER (1643) | LINE INTERFACE NUMBER (1644) | IPv6 NETWORK ID (1645) |
|---|---|---|---|---|---|
| 1 | 100F : : | 100F : : 250 | m | m | NW-m |
| 2 | 3FFF : : | 3FFF : : 250 | n | n | NW-n |
| 3 | 1111 : : | 1111 : : 250 | 1 | 1 | NW-1 |
| 4 | 2222 : : | 2222 : : 250 | 2 | 2 | NW-2 |
| 5 | 4FFF : : | 4FFF : : 250 | 3 | 3 | NW-3 |
| ⋮ | ⋮ | ⋮ | ⋮ | ⋮ | ⋮ |

IPv4 PACKET

IPv6 PACKET

PACKET TRANSFER APPARATUS PERFORMING ADDRESS TRANSLATION

BACKGROUND OF THE INVENTION (1) Field of the Invention

The present invention relates to a packet transfer apparatus and, more particularly, to a packet transfer apparatus adapted to connect a plurality of IP (Internet Protocol) networks of different address versions.

(2) Description of the Related Art

In a packet transfer apparatus for connecting an IPv4 network in which packet transfer is performed according to an IPv4 address and an IPv6 network in which packet transfer is performed according to an IPv6 address, an address translator function of executing IPv4-IPv6 address translation on a packet sent from the IPv4 network to the IPv6 network and, on the other hand, executing IPv6-IPV4 address translation on a packet sent from the IPv6 network to the IPv4 network is necessary.

The structure of a conventional address translator is designed on the basis of a packet transfer apparatus for use in an IPv4 network of an old address version and the address of a packet received from the IPv6 network is translated to an IPv4 address by providing an interface on the side of an IPv6 network as a new version with an address translating function, thereby performing packet routing in a node.

Specifically, in a conventional packet transfer apparatus, the address of a packet received from the IPv6 network is translated in accordance with an address version of a packet received from the IPv4 network, all of input packets are supplied in the form of IPv4 packets to an internal switch unit, and the address of a switched output packet to the IPv6 network is translated to an IPv6 address by the interface on the IPv6 network side.

In the case where communication is carried out between a first terminal connected to an IPv4 network and a second terminal connected to an IPv6 network, in the packet transfer apparatus for connecting the IPv4 network and the IPv6 network, a virtual IPv6 address is assigned to the first terminal, and a virtual IPv4 address is assigned to the second terminal. In an IPv4 packet on the IPv4 network, the first terminal is indicated by an actual IPv4 address and the second terminal is indicated by the virtual IPv4 address. In an IPv6 packet on the IPv6 network, the first terminal is indicated by the virtual IPv6 address and the second terminal is indicated by an actual IPv6 address. The address translation described above denotes translation between the actual IPv4 address and the virtual IPv6 address and translation between the virtual IPv4 address and the actual IPv6 address.

As a prior art relating to the address translation between IPv4 addresses and IPv6 addresses, for example, Japanese Unexamined Patent Publication No. 2001-285366 proposes, in order to deal with a shortage of the virtual IPv4 address, to search an address translation table on the basis of a combination of an IPv4 address and a virtual IPv4 address as a search key, so that the same virtual IPv4 address is commonly used by a plurality of IPv6 terminals.

SUMMARY OF THE INVENTION

In a conventional IPv4-based packet transfer apparatus, the address translation function is concentrated in the interface on the IPv6 network side. Consequently, as far as traffic on the IPv6 network side is lower than that on the IPv4 network side, no problem occurs. However, in future, when the IPv6 network is wide spread and traffic on the IPv6 network side increases, a problem arises such that the load of address translation on the interface on the IPv6 network side rapidly increases. In the case where the IPv4 network being connected is replaced with the IPv6 network and input packets from the IPv6 network occupy the grater part of input packets of the packet transfer apparatus, the structure of the conventional packet apparatus needs a technique of higher-speed address translation.

An object of the invention is to provide a packet transfer apparatus capable of performing address translation suitable for transition from an IP network of an old version to an IP network of a new version.

Another object of the invention is to provide a packet transfer apparatus capable of distributing the load for address translation.

Further another object of the invention is to provide a packet transfer apparatus capable of selectively executing address translation in accordance with the packet address version on an IP network accommodated thereto.

Further another object of the invention is to provide a packet transfer apparatus capable of controlling an address translation load on an interface of each IP network in accordance with a change in communication traffic among IP networks.

To achieve the object, the present invention provides a packet transfer apparatus comprising: a plurality of protocol processing units each connected to an IP network; and a switch for switching IP packets among the protocol processing units, wherein each of protocol processing units connected to an IPv4 network on which IP packets each having an IPv4 address are transferred includes: input-side address translating means for translating the address of an input packet received from the IPv4 network to an IPv6 address and supplying the address-translated packet to the switch; and output-side address translating means for translating, when an output packet having an IPv6 address is received from the switch, the address of the output packet to an IPv4 address and transferring the address-translated packet to the IPv4 network.

In an embodiment of the invention, each of the protocol processing units connected to the IPv4 network includes control means for transferring, when an output packet having an IPv4 address is received from the switch, the output packet to the IPv4 network not through the output-side address translating means.

One of features of the invention resides in that each of the protocol processing units connected to the IPv4 network includes: means for storing operation mode designation information indicating whether execution of address translation by the input-side address translating means is necessary or not; and packet transfer control means for transferring input packets received from the IPv4 network either in an IPv6 routing mode in which input packets are supplied to the switch after translating the address of each input packet to an IPv6 address or in an IPv4 routing mode of supplying the input packets to the switch without performing address translation, in accordance with the operation mode designation information.

With the configuration, since the operation mode can be selected from among the IPv6 routing mode and the IPv4 routing mode for each protocol processing unit, for example, by operating all of the protocol processing units in the IPv4 routing mode when all of IP networks accommodated in the packet transfer apparatus are IPv4 networks, the packet transfer apparatus is allowed to function as an apparatus dedicated to an IPv4 network. When an IPv6 network is added, the packet transfer apparatus can function as a packet transfer apparatus commonly used by the IPv4 and IPv6 networks by operating each of the protocol processing units connected to the IPv4 network in the IPv6 routing mode.

Another feature of the invention resides in that at least one of the plurality of protocol processing units is connected to an IPv6 network on which IP packets each having an IPv6 address are transferred, and the protocol processing unit includes: output-side address translating means for translating, when an output packet having an IPv4 address is received from the switch, the address of the output packet to an IPv6 address and transferring the address translated packet to the IPv6 network; and means for transferring, when an output packet having an IPv6 address is received from the switch, the output packet to the IPv6 network not through the output-side address translating means.

With the configuration, since the address of output packets each having the IPv4 address can be translated by the protocol processing unit connected to the IPv6 network, address translation on the IPv4 network side can be omitted and the load of the address transforming processing can be selectively shifted to the IPv6 network.

In an example of the invention, the protocol processing unit connected to the IPv6 network includes: input-side address translating means for translating the address of an input packet received from the IPv6 network to an IPv4 address and supplying the address translated packet to the switch; means for storing operation mode designation information indicating whether execution of address translation by the input-side address translating means is necessary or not; and packet transfer control means for transferring input packets received from the IPv6 network either in an IPv4 routing mode in which the input packets are supplied to the switch after translating the address of each input packet to an IPv4 address or an IPv6 routing mode of supplying the input packets to the switch without performing address translation, in accordance with the operation mode designation information.

With the configuration, by operating the protocol processing unit on the IPv6 network side in the IPv4 routing mode, the address translation processing on the output side in the IPv4 network side protocol processing unit can be omitted. Thus, the address translation load in the IPv4 network side protocol processing unit can be reduced.

According to the invention, there is also provided a packet transfer apparatus comprising: a plurality of protocol processing units each connected to an IP network; and a switch for switching IP packets among the protocol processing units, wherein each of the protocol processing units includes: first input-side address translating means for translating the IPv4 address of an input packet received from an IP network to an IPv6 address and supplying the address translated packet to the switch; second input-side address translating means for translating the IPv6 address of an input packet received from the IP network into an IPv4 address and supplying the address translated packet to the switch; first output-side address translating means for translating, when an output packet having an IPv6 address is received from the switch, the address of the output packet to an IPv4 address and transferring the address translated packet to the IP network; second output-side address translating means for translating, when an output packet having an IPv4 address is received from the switch, the address of the output packet to an IPv6 address and transferring the address translated packet to the IP network; and control means for selecting either the first or second input-side address translating means and either the first or second output-side address translating means in accordance with the address version of IP packets transferred on the IP network to which the protocol processing unit is connected, and performing address translation on the input packets and output packets with the selected address translating means.

Another feature of the invention resides in that the packet transfer apparatus further includes means for selectively suppressing execution of address translation by the first and second input-side address translating means in accordance with a control instruction from the outside.

Further another feature of the invention resides in that the first and second output-side address translating means translates the address of the output packets received from the switch so as to adapt the address version of each output packet to the address version in the IP network connected to the protocol processing unit.

BRIEF DESCRIPTION OF THE DRAWINGS

FIG. 5 is a diagram showing an example of information entries of an IPv4/IPv6 translation table 166 of the protocol processing unit 10.

FIG. 6 is a diagram showing an example of information entries of an IPv4 routing table 165 of the protocol processing unit 10.

FIG. 7 is a diagram showing an example of information entries of an IPv6 routing table 164 of the protocol processing unit 10.

DESCRIPTION OF THE PREFERRED EMBODIMENTS

Embodiments of the invention will be described hereinbelow with reference to the drawings.

Figure 1:
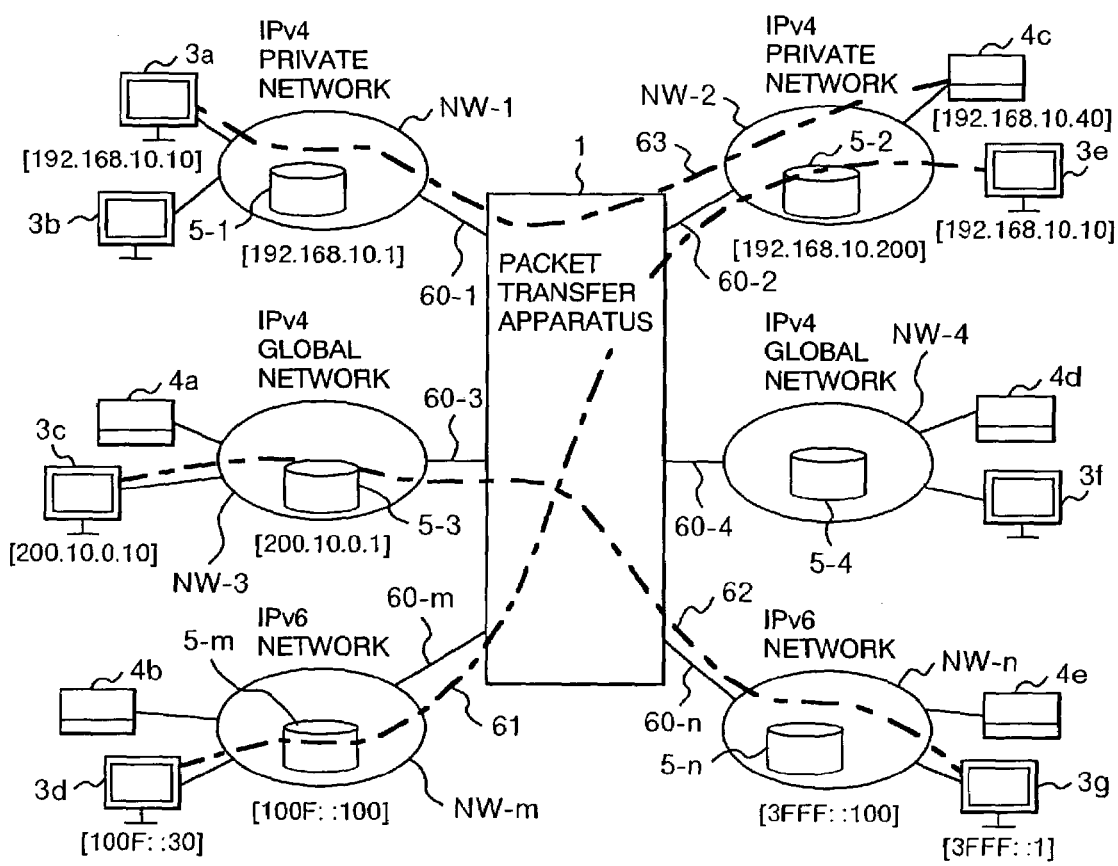
FIG. 1 is a diagram showing an example of a network configuration to which a packet transfer apparatus of the invention performing address translation is applied.

FIG. 1 shows an example of a network configuration to which a packet transfer apparatus performing address translation according to the invention is applied.

A packet transfer apparatus 1 interconnects a plurality of IPv4 networks (IPv4 private networks NW-1 and NW-2 and IPv4 global networks NW-3 and NW-4) for transferring packets in accordance with their IPv4 destination addresses and a plurality of IPv6 networks (NW-m and NW-n) for transferring IP packets in accordance with their IPv6 destination addresses.

Shown in FIG. 1 are terminals 3 (3$a$ to 3$g$) connected to the IP networks, various servers 4 (4$a$ to 4$e$) connected to the IP networks, and DNS (Domain Name System) servers 5 (5-1 to 5-4, 5-$m$, and 5-$n$) provided for each IP network. Numerical values in brackets show values of IP addresses assigned to the terminals and servers. Alternate long and short dash lines 61, 62, and 63 denote communication paths of communication between terminals via the packet transfer apparatus 1 and communication between a terminal and a server via the packet transfer apparatus 1.

In the communication path 61 between the terminal 3$d$ connected to the IPv6 network NW-m and the terminal 3$e$ connected to the IPv4 private network NW-2, the packet transfer apparatus 1 performs translation between an IPv4 address [100F::30] and a virtual IPv6 address of the terminal 3$d$ and translation between an IPv6 address [192.168.10.10] and a virtual IPv4 address of the terminal 3$e$. Similarly, the packet transfer apparatus 1 performs translation to/from a virtual IPv6 address or virtual IPv4 address with respect to the IPv4 address [200.10.0.10] of the terminal 3$c$ and the IPv6 address [3FFF::1] of the terminal 3$g$ in the communication path 62 between the terminal 3$c$ connected to the IPv4 global network NW-3 and the terminal 3$g$ connected to the IPv6 network NW-n and with respect to the IPv4 address [192.168.10.10] of the terminal 3$a$ and the IPv6 address [192.168.10.40] of the server 4$c$ in the communication path 63 between the terminal 3$a$ connected to the IPv4 private network Nw-1 and the server 4$c$ connected to the IPv4 private network NW-2.

Figure 2:
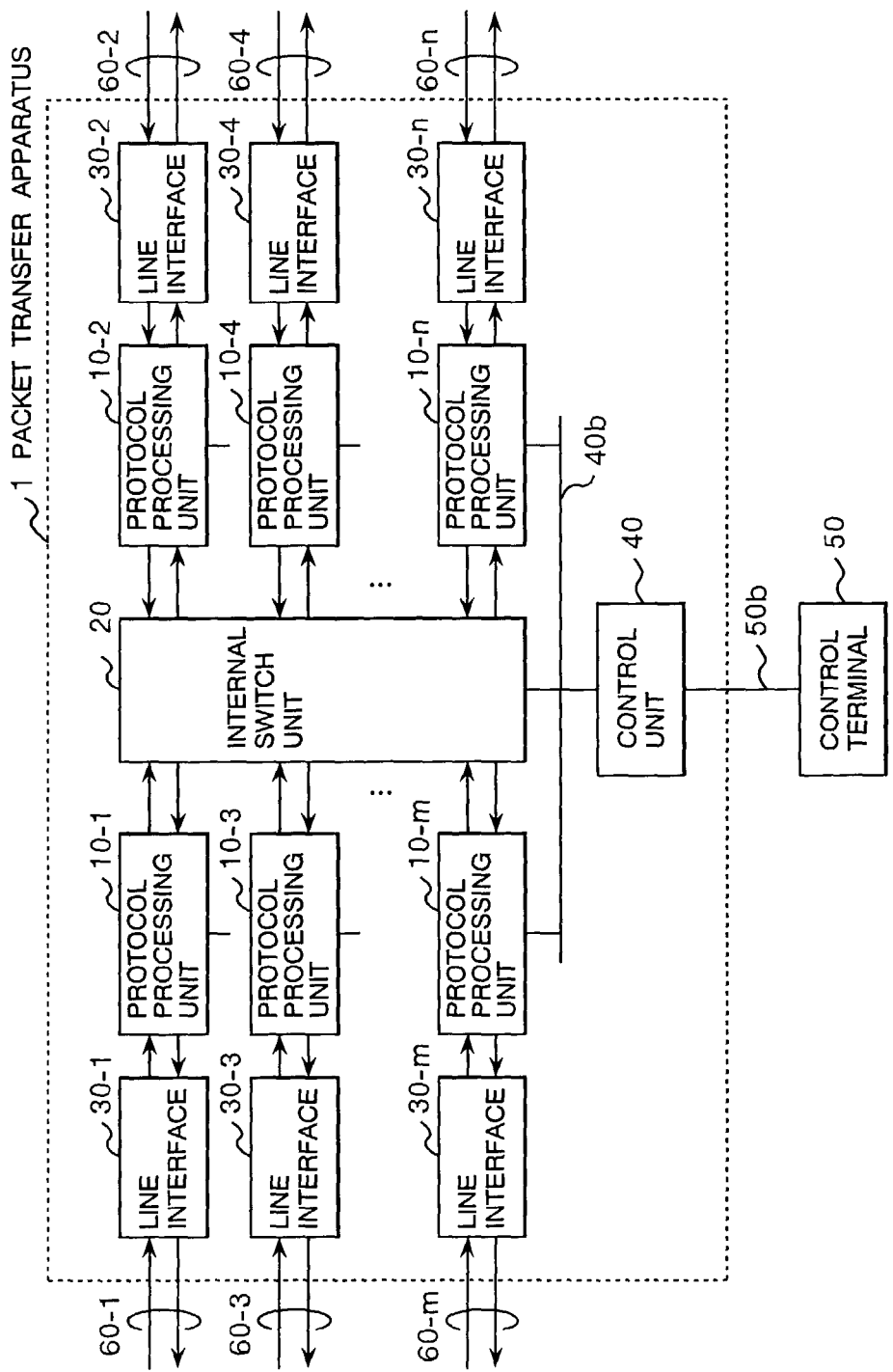
FIG. 2 is a block diagram showing an example of a packet transfer apparatus 1 according to the invention.

FIG. 2 shows an example of the packet transfer apparatus 1.

The packet transfer apparatus 1 includes: a plurality of line interfaces (TNF) 30-$i$ connected to input and output lines 60-$i$ of IP networks NW-i (i=1 to n); a plurality of protocol processing units 10-$i$ provided in correspondence with the line interfaces 30-$i$; an internal switch unit 20 connected to the protocol processing units 10-$i$; and a control unit 40 connected to the protocol processing units 10-$i$ and the internal switch unit 20 via an internal control bus 40$b$ and connected to a control terminal 50 via an external bus 50$b$. The control unit 40 monitors the states of the protocol processing units 10-$i$ and the internal switch unit 20 via the control bus 40$b$, notifies the control terminal 50 of the monitored states as a node internal state and, in response to an instruction from the control terminal 50, sets various control parameters to each of the protocol processing units 10-$i$.

The line interface 30-$i$ reproduces IP packets from a received signal of an IP network, transfers the IP packets to the protocol processing unit 10-$i$, translates an output IP packet received from the protocol processing unit 10-$i$ into a communication frame format conformed with a communication protocol on the input and output line 60-$i$, for example, Ethernet (trademark), ATM, or the like, and transmits the resultant packet to the IP network.

Each of the protocol processing units 10-$i$ has a protocol processing function of performing IP routing for adding an internal header indicative of an output port number to each IP packet received from the line interface 30-$i$ by referring to a routing table on the basis of a destination IP address (DA) included in an IP header, IP address translation to be described later, and the like. The internal switch unit 20 transfers the IP packets received from each of the protocol processing units 10-$i$ (i=1 to n) to the protocol processing unit 10-$j$ specified by routing information (output port number j) indicated in the internal header.

Figure 3:
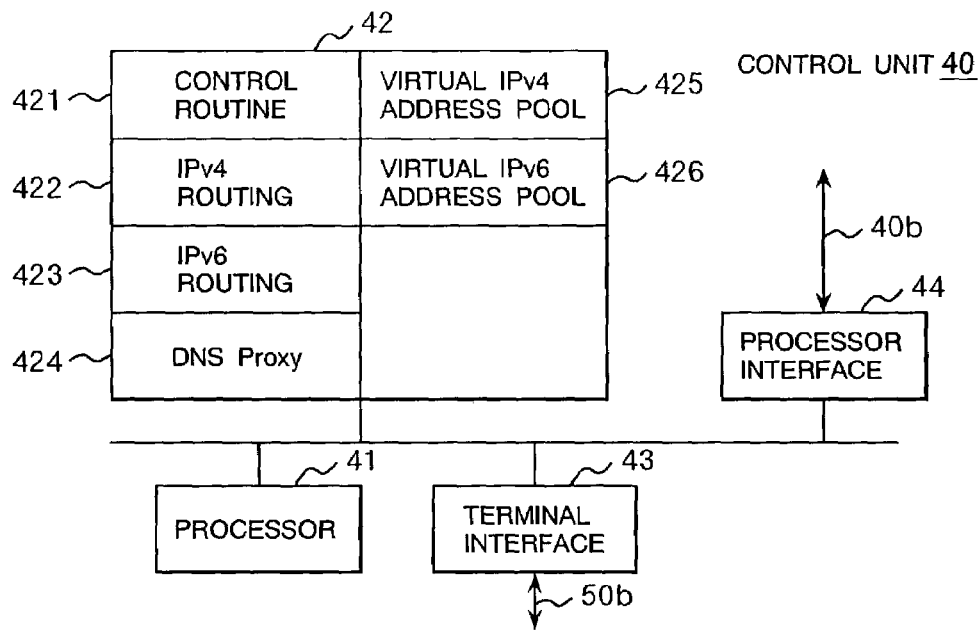
FIG. 3 is a diagram showing an example of a control unit 40 of the packet transfer apparatus 1.

FIG. 3 shows an example of the control unit 40.

The control unit 40 includes a processor 41, a memory 42, a terminal interface 43 for performing communication with the control terminal 50 via the external bus 50$b$, and a processor interface 44 for performing communication with processors of the protocol processing units 10-$i$ (i=1 to n) via the internal control bus 40$b$.

In the memory 42, various programs and data to be used by the processor 41 are stored. The programs include not only a main control routine 421 but also, for example, an IPv4 routing processing routine 422, an IPv6 routing processing routine 423, and a DNS proxy processing routine 424. In the memory 42, a virtual IPv4 address pool table 425 and a virtual IPv6 address pool table 426 are prepared. The processor 41 retrieves an unused IP address from the tables and assigns a virtual IPv4 address or a virtual IPv6 address to be made correspond to the IPv6 address or the IPv4 address of a received packet.

Figure 4:
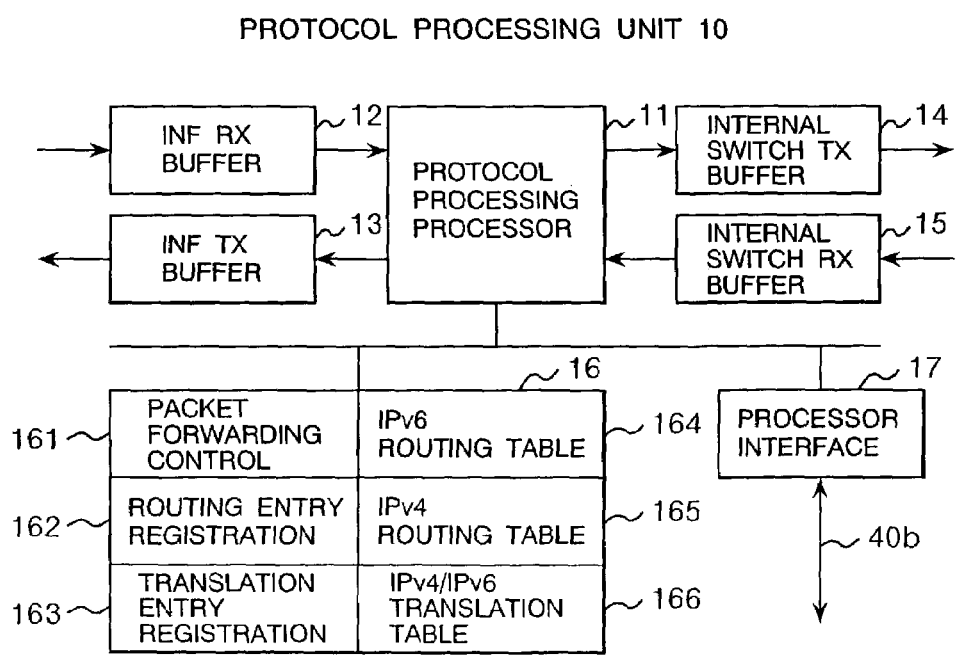
FIG. 4 is a diagram showing an example of a protocol processing unit 10 in the packet transfer apparatus 1.

FIG. 4 shows an example of the protocol processing unit 10 (10-1 to 10-n) applied to the packet transfer apparatus 1.

The protocol processing unit 10 includes a protocol processing processor 11, a line interface side receiving (INF RX) buffer 12, a line interface side transmission (INF TX) buffer 13, an internal switch side transmission buffer 14, an internal switch side receiving buffer 15, a memory 16, and a processor interface 17.

In the memory 16, for example, a packet forwarding control routine 161, a routing entry registration processing routine 162, a translation entry registration processing routine 163, an IPv6 routing table 164, an IPv4 routing table 165, and an IPv4/IPv6 translation table 166 are prepared.

By the packet forwarding control routine 161, the protocol processing processor 11 reads out IP packets alternately from the INF RX buffer 12 and the internal switch side transmission buffer 15 and, as necessary, performs address translation with reference to the IPv4/IPv6 translation information table 166. The protocol processing processor 11 executes a routing processing by referring to the IPv6 routing table 164 or IPv4 routing table 165 in accordance with the address version of each IP packet, and transfers the IP packet to the internal switch side transmission buffer 14 or INF TX buffer 13.

When the first packet of a communication path which needs address translation from IPv4 to IPv6 (IPv4-IPv6 address translation) or address translation from IPv6 to IPv4 (IPv6-IPv4 address translation) is received, the packet forwarding control routine 161 executes the translation entry registration processing routine 163. By the routine, the control unit 40 is requested via the processor interface 17 to perform a DNS proxy processing and to assign a virtual IPv4/IPv6 address. According to the response from the control unit 40, the data in the IPv4/IPv6 translation table 166 is updated.

When the received packet includes a new network address or a new IP address, the packet forwarding control routine 161 executes the routing entry registration processing routine 162 to request the control unit 40 to perform the routing processing. The result of the routing processing is reflected in the IPv4 routing table 165 and IPv6 routing table 164. Registration of a new information entry to the IPv6 routing table 164, IPv4 routing table 165, and IPv4/IPv6 translation table 166 and change in registered data can be performed also in response to an instruction from the control terminal 50.

FIG. 5 shows an example of information entries of the IPv4/IPv6 translation table 166.

The IPv4/IPv6 translation table 166 is constructed by an IPv4 information field 166A and an IPv6 information field 166B. As shown in the diagram, a plurality of entries E61, E62, . . . having entry numbers 1660 are registered.

The IPv4 information field 166A shows the relation among an IPv4 address 1661a of a terminal (IPv4 terminal) connected to the IPv4 network, a virtual IPv4 address 1662a assigned to a terminal (IPv6 terminal) connected to an IPv6 network with which the IPv4 terminal is performing communication, and an IPv4 network ID 1663a indicative of the IP network to which the IPv4 terminal is connected.

The IPv6 information field 166B shows the relation among a virtual IPv6 address 1661b assigned to the IPv4 terminal, an IPv6 address 1662b of the IPv6 terminal, and an IPv6 network ID 1663b indicative of an IP network to which the IPv6 terminal is connected.

As the virtual IPv4 address 1662a and the virtual IPv6 address 1661b, values of virtual IP addresses retrieved from the virtual IPv4 address pool table 425 and the virtual IPv6 address pool table 426 of the control unit 40 are set.

In the translation table 166 of FIG. 5, the entries E61 and E62 have address translation information for the communication paths 61 and 62 shown in FIG. 1, respectively, and entries E63a and E63b have address translation information for the communication path 63.

In the IPv4 private network, the value of an IP address can be freely determined. Consequently, in the communication path 63 for connecting the IPv4 private network NW-1 and the IPv4 private network NW-2, there is the possibility that the terminal 3a on the network NW-1 side and the server 4c on the network NW-2 side have the same IP address value.

In the embodiment, even in the case where communication is performed between terminals (or between a terminal and a server) having the same IPv4 private address, by translating the IPv4 private address of each received packet to a virtual IPv6 address by the packet transfer apparatus 1, the packets are dealt as communication packets between terminals having different IPv6 addresses in the packet transfer apparatus 1.

The entry E63a indicates address information to be referred to when a received packet from the terminal 3a connected to the IPv4 private network NW-1 is processed. The entry E63b indicates address information to be referred to when a received packet from the server 4c connected to the IPv4 private network NW-2 is processed. In each of the IPv6 address 1662b and the IPv6 network ID 1663b of entries E63a and E63b, a value for a virtual network valid only in the packet transfer apparatus 1 is set. In the example of the diagram, a communication packet between the terminal 3a and the server 3c is switched as a communication packet between the terminal 3a having the virtual IPv6 address [1111::10] and the server 4c having the virtual IPv6 address [2222::210].

FIG. 6 shows an example of information entries registered in the IPv4 routing table 165.

In the IPv4 routing table 165, a plurality of routing information entries having entry numbers 1650 are registered. Each entry shows the relation of a network address 1651, a next hop address 1652, an internal switch output port number (protocol processing unit number) 1653, a line interface number 1654, and an IPv4 network ID 1655. By retrieving an entry having the network address 1651 matched with a destination IPv4 address of the received packet from the IPv4 routing table 165, the output port number 1653 from which the received packet should be output, line interface number 1654, and IPv4 network ID 1655 are specified.

FIG. 7 shows an example of information entries registered in the IPv6 routing table 164.

In the IPv6 routing table 164, a plurality of routing information entries having entry numbers 1640 are registered. In a manner similar to the IPv4 routing table 165, each entry shows the relation of a network address 1641, a next hop address 1642, an output port number (protocol processing unit number) 1643, a line interface number 1644, and an IPv6 network ID 1645. By retrieving an entry having the network address 1641 matching with the destination IPv6 address of the received packet from the IPv6 routing table 164, the output port number 1643 from which the received packet should be output, line interface number 1644, and IPv6 network ID 1645 are specified.

Figure 8:
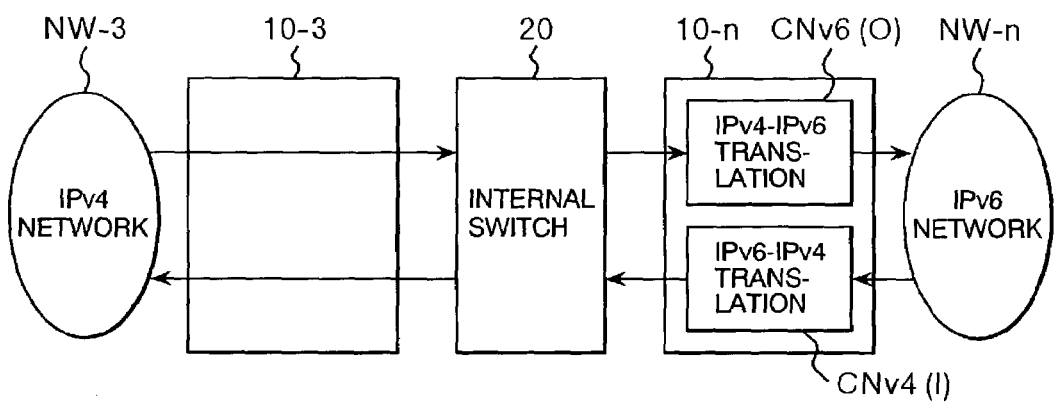
FIG. 8 is a diagram showing the configuration of an address translator in a conventional packet transfer apparatus.

FIG. 8 shows the configuration of an address translator in a conventional packet transfer apparatus with attention paid to the communication path 62 in FIG. 1.

The communication path 62 extends via the protocol processing unit 10-3 connected to the IPv4 global network NW-3, the protocol processing unit 10-n connected to the IPv6 network NW-n, and the internal switch unit 20. Since packet switching is carried out on the IPv4 packet basis in the conventional packet transfer apparatus, an IPv4-IPv6 address translation processing CNv6(O) targeted for an output packet and an IPv6-IPv4 address translation processing CNv4(I) targeted for an input packet are executed by the protocol processing unit 10-n on the IPv6 network side.

Figure 9:
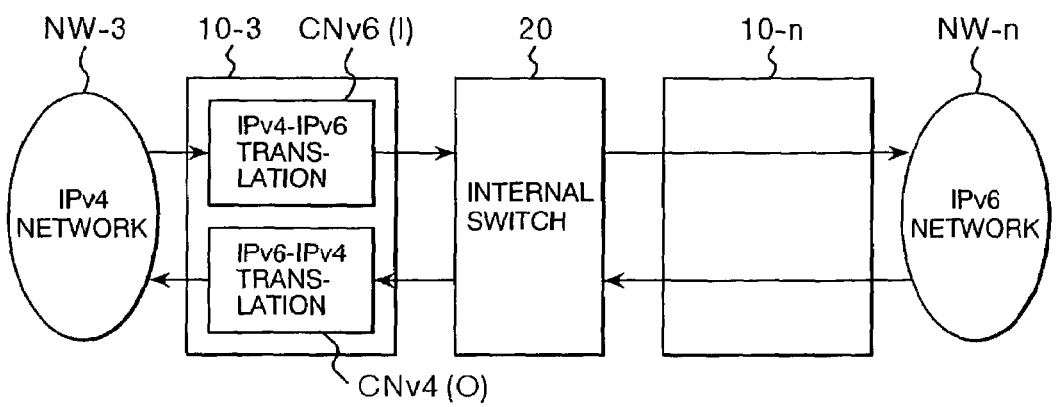
FIG. 9 is a diagram showing a basic configuration of an address translator in the packet transfer apparatus of the invention.

FIG. 9 shows a basic configuration of an address translator in the packet transfer apparatus 1 according to the invention with attention paid to the communication path 62.

In the invention, by executing an IPv4-IPv6 address translation processing CNv6(I) targeted for input packets and an IPv6-IPv4 address translation processing CNv4(O) targeted for output packets in the protocol processing unit 10-3 on the IPv4 network side, packet switching on the IPv6 packet basis (IPv6 routing) is performed in the packet transfer apparatus. The address translation processing CNv6(I) and CNv4(O) are a part of the packet forwarding control routine 161.

Figure 10:
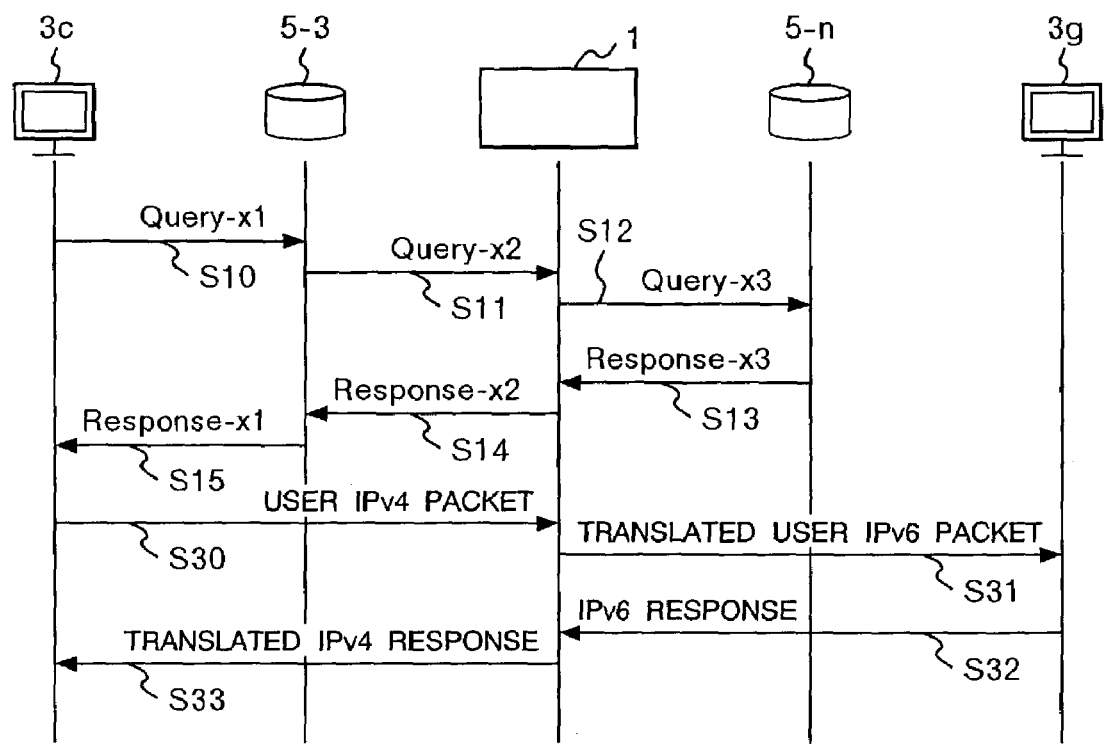
FIG. 10 is a diagram showing a sequence of communication connection from a terminal 3c to a terminal 3g via the packet transfer apparatus of the invention.

FIG. 10 shows, as an example of a procedure of performing communication between terminals via the packet transfer apparatus 1 of the invention, a connection sequence in the case where there is a request of connection of the communication path 62 from the terminal 3c connected to the IPv4 global network NW-3 to the terminal 3g connected to the IPv6 network NW-n.

It is based on preconditions that, to enable communication with the DNS server 5-n connected to the IPv6 network NW-n, the address of the DNS server 5-n is pre-registered as a virtual IPv4 address in the DNS server 5-3 connected to the IPv4 network NW-3 and, similarly, the address of the DNS server 5-3 is registered as a virtual IPv6 address in the DNS server 5-n. It is also assumed that the corresponding relation between the IPv4 address and the virtual IPv6 address of the DNS server 5-3 and the corresponding relation between the IPv6 address and the virtual IPv4 address of the DNS server 5-n are pre-registered in the IPv4/IPv6 translation table 166 of the packet transfer apparatus 1.

The terminal 3c transmits an address request IPv4 packet Query-x1 for obtaining the IP address of the terminal 3g from the domain name of the terminal 3g to the DNS server 5-3 (step S10). Since the DNS server 5-3 does not manage the IP address corresponding to the domain name indicated in the Query-x1, the DNS server 5-3 transmits an address request IPv4 packet Query-x2 to the DNS server 5-n which manages the domain name and the IP address of the terminal 3g (S11). In this case, as the destination address of the IPv4 packet Query-x2, the virtual IPv4 address of the DNS server 5-n is applied.

The packet Query-x2 transmitted from the DNS server 5-3 is received by the protocol processing unit 10-3 of the packet transfer apparatus 1 and transferred to the control unit 40. The control unit 40 receives the Query-x2 and executes the DNS proxy processing routine 424.

Figure 11A:
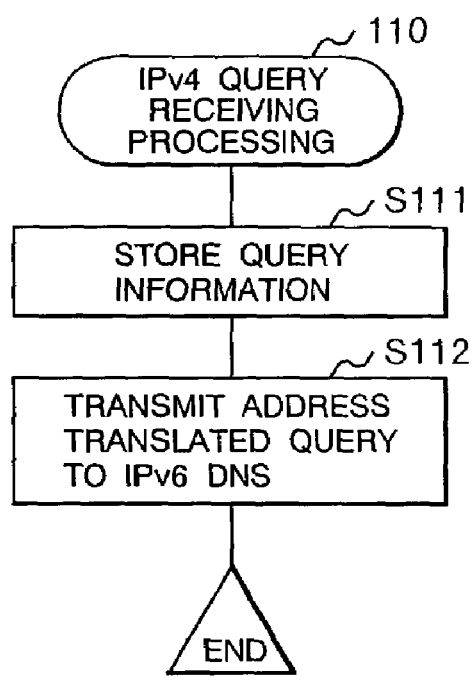
FIG. 11A and FIG. 11B show a flowchart of an IPv4 query receiving processing 110 and a flowchart of an IPv6 response receiving processing 130 executed by the control unit 40, respectively.
Figure 11B:
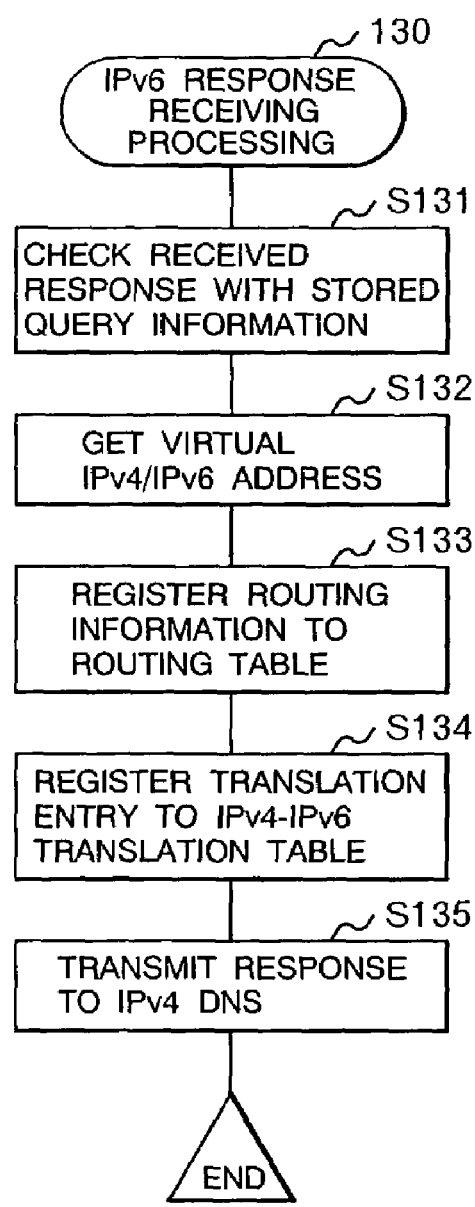
Figure 13A:
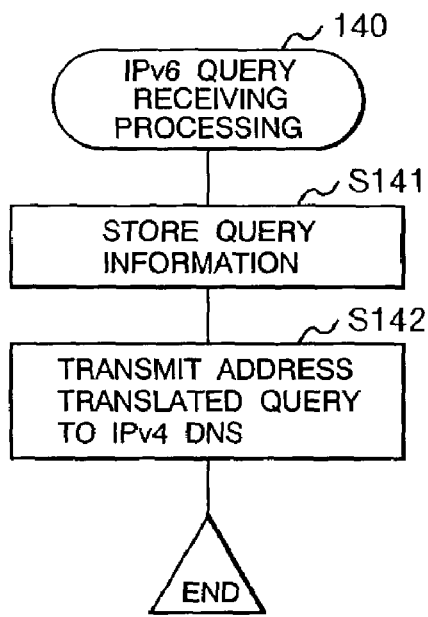
FIG. 13A and FIG. 13B show a flowchart of an IPv6 query receiving processing 140 and a flowchart of an IPv4 response receiving processing 150 executed by the control unit 40, respectively.
Figure 13B:
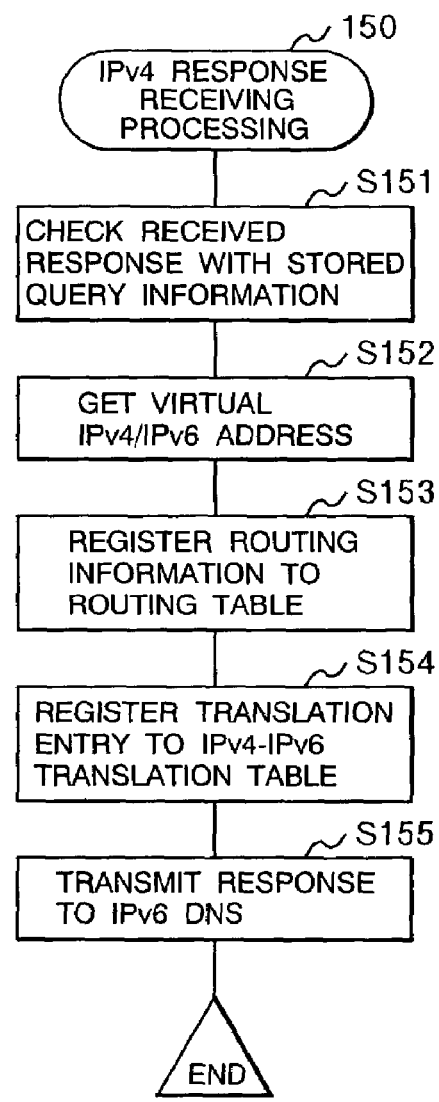

The DNS proxy processing routine 424 includes an IPv4 query receiving processing routine 110 shown in FIG. 11A, an IPv6 response receiving processing routine 130 shown in FIG. 11B, an IPv6 query receiving processing routine 140 shown in FIG. 13A, and an IPv4 response receiving processing routine 150 shown in FIG. 13B.

When the Query-x2 is received, in the control unit 40, the processor 41 executes the IPv4 query receiving processing routine 110 shown in FIG. 11A to temporarily store information of the Query-x2 into a memory (S111), translate the address of the Query-x2 to an IPv6 address, and transfer the address-translated query to the DNS on the IPv6 network side (S112). The translation to the IPv6 address is performed by executing the packet forwarding control routine 161 by the processor 11 of the protocol processing unit 10-3 in response to an instruction from the processor 41.

In the protocol processing unit 10-3, by the IPv4-IPv6 address translation processing CNv6(I), the destination IP address of the Query-x2 is translated from the virtual IPv4 address to the IPv6 address of the DNS server 5-n, the transmission source address is translated from the IPv4 address to the virtual IPv6 address of the DNS server 5-3, and the resultant packet is transmitted as an address request IPv6 packet Query-x3 to the DNS server 5-n (S12).

When the address request IPv6 packet Query-x3 is received, the DNS server 5-n retrieves the IPv6 address of the terminal 3g and transmits a response IPv6 packet Response-x3 to the DNS server 5-3 (S13). The Response-x3 is received by the packet transfer apparatus 1 as a proxy of the DNS server 5-3 and transferred from the protocol processing unit 10-n to the control unit 40.

At this time, the control unit 40 executes the IPv6 response receiving processing 130 shown in FIG. 11B. First, the control unit 40 checks the corresponding relation between Response-x3 received this time and Query-x2 stored in the memory (S131), gets a virtual IPv4 address to be made correspond to the IPv6 address of the terminal 3g indicated by Response-x3 from the virtual IPv4 address pool table 425, and gets a virtual IPv6 address to be made correspond to the IPv4 address of the terminal 3c from the virtual IPv6 address pool table 426 (S132).

In the case where routing information necessary to transfer the user IPv4 packet transmitted from the terminal 3c to the terminal 3g is not stored yet in the IPv4 routing table 165 of the protocol processing unit 10-3 or in the case where routing information necessary to transfer the user IPv6 packet transmitted from the terminal 3g to the terminal 3c is not stored yet in the IPv6 routing table 164 of the protocol processing unit 10-n, the control unit 40 generates routing information by the IPv4 routing processing routine 422 and the IPv6 routing processing routine 423 and allows the protocol processing units 10-3 and 10-n to execute the routing entry registration processing routine 162, thereby registering the routing information into a corresponding routing table (S133). After that, via the translation entry registration processing routine 163 of the protocol processing units 10-3 and 10-n, a new address translation information entry including the virtual IPv4 address and the virtual IPv6 address is registered into the IPv4/IPv6 translation table 166 (S134).

After completion of registration of the table entry, via the protocol processing unit 10-3, the response IPv6 packet Response-x3 is transmitted to the DNS server 5-3 (S135). At this time, the protocol processing unit 10-3 executes the IPv6-IPv4 translation processing CNv4(O) to translate the destination address of the response IPv6 packet Response-x3 from the virtual IPv6 address to the IPv4 address of the DNS server 5-3 and translate the transmission source address from the IPv6 address to the virtual IPv4 address of the DNS server 5n, and transmits the resultant packet as the response IPv4 packet Response-x2 to the DNS server 5-3 (S14).

When the response IPv4 packet Response-x2 is received, the DNS server 5-3 checks that the response IPv4 packet Response-x2 is a packet responding to the address request IPv4 packet Query-x2 and, after that, transmits it as the response IPv4 packet Response-x1 to the terminal 3c as a requester (S15). The terminal 3c can know the IP address (virtual IPv4 address) of the terminal 3g by receiving the Response-x1, it can transmit an IPv4 packet including user information to the terminal 3g by using the virtual IPv4 address as a destination IP address (S30).

When the user IPv4 packet is received, with reference to the IPv4/IPv6 translation table 166, the packet transfer apparatus 1 translates the destination address of the received packet from the virtual IPv4 address to the IPv6 address of the terminal 3g, translates the transmission source address from the IPv4 address to the virtual IPv6 address of the terminal 3c and transmits the address-translated packet as an IPv6 packet to the terminal 3g (S31). The terminal 3g receives the IPv6 packet and returns a response IPv6 packet to the terminal 3c (S32).

The response IPv6 packet is received by the packet transfer apparatus 1. The destination address is translated from the virtual IPv6 address to the IPv4 address of the terminal 3c and the source address is translated from the IPv6 address to the virtual IPv4 address of the terminal 3g by the IPv6-IPv4 translation processing CNv6(O) performed by the protocol processing unit 10-3 with reference to the IPv4/IPv6 translation table 166. After that, the address-translated packet is transmitted as a response IPv4 packet to the terminal 3c (S33).

Figure 12:
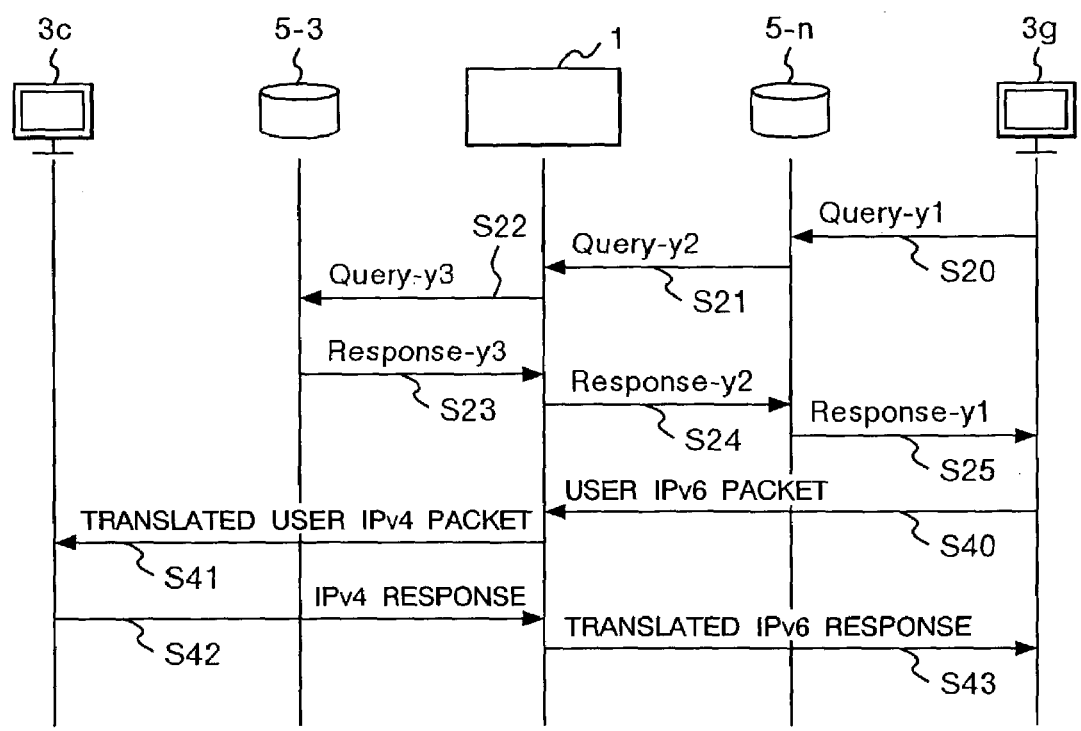
FIG. 12 is a diagram showing a sequence of communication connection from a terminal 3g to a terminal 3c via the packet transfer apparatus of the invention.

FIG. 12 shows a procedure of communication in the case where a connection request is sent from the terminal 3g to the terminal 3c in the manner opposite to the case of FIG. 10.

When the terminal 3g transmits the address request IPv6 packet Query-y1 for obtaining the IP address of the terminal 3c to the DNS server 5-n (S20) the DNS server 5-n transmits the address request IPv6 packet Query-y2 to the DNS server 5-3 which manages the domain name and the IP address of the terminal 3c (S21). In this case, as the destination address of the IPv6 packet, the virtual IPv6 address assigned to the DNS server 5-3 is applied.

The address request IPv6 packet Query-y2 is received by the packet transfer apparatus 1 as a proxy of the DNS server 5-3 and the DNS proxy processing routine 424 is executed in the control unit 40. In this case, the IPv6 query receiving processing 140 shown in FIG. 13A is executed and the information of the Query-y2 is temporarily stored in the memory (S141). After that, the address request IPv4 packet Query-y3 obtained by address translation by the protocol processing unit 10-3 is transmitted from the packet transfer apparatus 1 to the DNS server 5-3 (S142).

At this time, the protocol processing unit 10-3 executes the IPv6-IPv4 translation processing CNv4(O) to translate the destination address of the IPv6 packet Query-y2 from the virtual IPv6 address to the IPv4 address of the DNS server 5-3 and to translate the source address from the IPv6 address to the virtual IPv4 address of the DNS server 5-n, and transmits the resultant packet as the address request IPv4 packet Query-y3 to the DNS server 5-3 (S22). The address translation is performed with reference to the IPv4/IPv6 translation table 166.

When the address request Query-y3 is received, the DNS server 5-3 retrieves the IPv4 address of the terminal 3c and transmits the response IPv4 packet Response-y3 indicative of the IPv4 address to the packet transfer apparatus 1 as a proxy of the DNS server 5-n (S23).

The address response IPv4 packet is received by the packet transfer apparatus 1 and transferred from the protocol processing unit 10-3 to the control unit 40. In the control unit 40, the DNS proxy processing routine 424 is executed.

In this case, the control unit 40 executes the IPv4 response receiving processing 150 shown in FIG. 13B. In a manner similar to FIG. 11B, the control unit 40 checks the correspondence relation between the Response-y3 received this time and Query-y2 stored in the memory (S151), retrieves the virtual IPv6 address to be made correspond to the IPv4 address of the terminal 3c indicated by Response-y3 from the virtual IPv4 address pool table 426 and retrieves the virtual IPv4 address to be made correspond to the IPv6 address of the terminal 3g from the virtual IPv4 address pool table 425 (S152).

In the case where routing information necessary to transfer the user IPv6 packet transmitted from the terminal 3g to the terminal 3c is not stored yet in the IPv6 routing table 164 of the protocol processing unit 10-n or in the case where routing information necessary to transfer the user IPv4 packet transmitted from the terminal 3c to the terminal 3g is not stored yet in the IPv4 routing table 165 of the protocol processing unit 10-3, the control unit 40 generates routing information by the IPv4 routing processing routine 422 and the IPv6 routing processing routine 423 and allows the protocol processing units 10-3 and 10-n to execute the routing entry registration processing routine 162, thereby registering the routing information into a corresponding routing table (S153).

After that, by the translation entry registration processing routine 163 executed by the protocol processing units 10-3 and 10-n, a new address translation information entry including the virtual IPv4 address and the virtual IPv6 address is registered into the IPv4/IPv6 translation table 166 (S154).

After completion of registration of the table entries, via the protocol processing unit 10-3, the response IPv6 packet Response-y2 is transmitted to the DNS server 5-n (S155).

At this time, the protocol processing unit 10-3 executes the IPv4-IPv6 address translation processing CNv6(I) to translate the destination address of the response IPv4 packet Response-y3 from the virtual IPv4 address to the IPv6 address of the DNS server 5-n and translate the source address from the IPv4 address to the virtual IPv6 address of the DNS server 5-3, and transmits the resultant packet as the response IPv6 packet Response-y2 to the DNS server 5-n (S24). The response IPv4 packet is routed in the packet transfer apparatus 1 in accordance with the IPv4 routing table 165 of the protocol processing unit 10-3.

When the response IPv6 packet Response-y2 is received, the DNS server 5-n checks that the response IPv6 packet Response-y2 is a packet responding to the address request IPv6 packet Query-y1 and, after that, transmits it as the response IPv6 packet Response-y1 to the terminal 3g as a requester (S25). The terminal 3g which obtained the IP address (virtual IPv6 address) of the terminal 3c by receiving of the address response IPv6 packet Response-y1 can transmit an IPv6 packet including user information to the terminal 3c by using the virtual IPv6 address as a destination IP address (S40)

On receipt of the user IPv6 packet, the packet transfer apparatus 1 routes the received packet with reference to the IPv6 routing table 164 of the protocol processing unit 10-n on the input side. Further, with reference to the IPv4/IPv6 translation table 166 of the protocol processing unit 10-3 on the output side, the packet transfer apparatus 1 translates the destination address of the received packet from the virtual IPv6 address to the IPv4 address of the terminal 3c, translates the source address from the IPv6 address to the virtual IPv4 address of the terminal 3g and transmits the address-translated packet as an IPv4 packet to the terminal 3c (S41).

The terminal 3c receives the IPv4 packet and returns a response IPv4 packet to the terminal 3g (S42). The response IPv4 packet is received by the packet transfer apparatus 1. In the protocol processing unit 10-3 on the input side, according to the IPv4/IPv6 translation table 166, the destination address of the response IPv4 packet is translated from the virtual IPv4 address to the IPv6 address of the terminal 3g and the source address is translated from the IPv4 address to the virtual IPv6 address of the terminal 3c. The address-translated packet is routed with reference to the IPv6 routing table 164 and transmitted as a response IPv6 packet to the terminal 3g (S43).

By the above connection sequence, an address request from any of the IPv4 terminal and the IPv6 terminal is properly responded and connection between the IPv4 terminal and the IPv6 terminal can be established.

Figure 14:
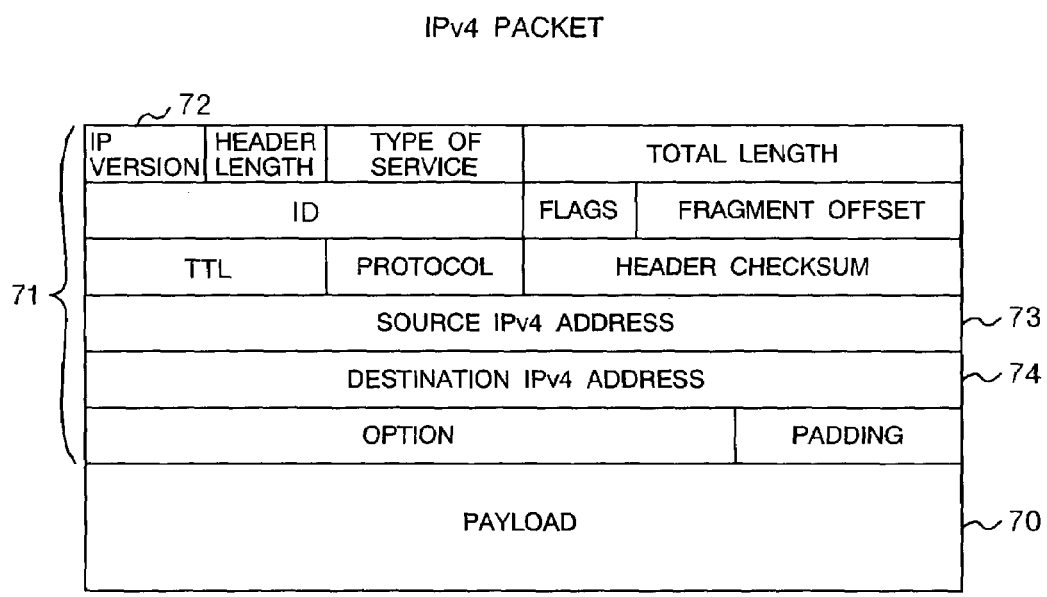
FIG. 14 is a diagram showing a format of an IPv4 packet.

FIG. 14 shows the format of an IPv4 packet.

The IPv4 packet is comprised of a payload (information) field 70 and a header 71. The header 71 includes a source IPv4 address 73 of 32 bits, a destination IPv4 address 74 of 32 bits, and other header information. Whether a packet is an IPv4 packet or IPv6 packet can be determined by a set value in a version field 72.

In the invention, in the source IPv4 address field 73 of an IP packet transmitted from the IPv4 terminal to the IPv6 terminal, the IPv4 address of the IPv4 terminal is set. In the destination IPv4 address field 74, a virtual IPv4 address assigned to the IPv6 terminal is set. In the source IPv4 address field 72 of an IP packet transmitted from the IPv6 terminal to the IPv4 terminal, a virtual IPv4 address assigned to the IPv6 terminal is set. In the destination IPv4 address field 74, the IPv4 address of the IPv4 terminal is set.

Figure 15:
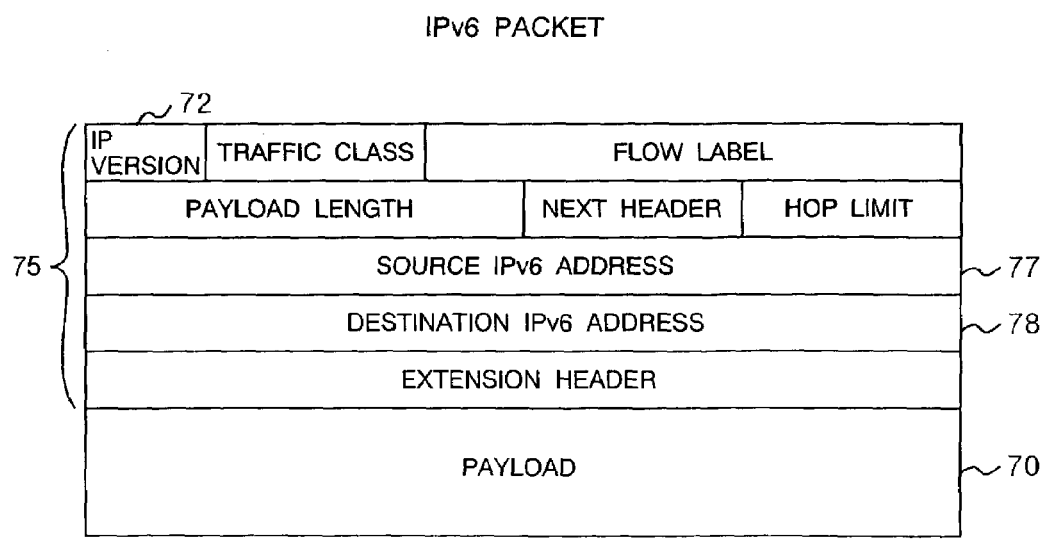
FIG. 15 is a diagram showing a format of an IPv6 packet.

FIG. 15 shows the format of an IPv6 packet.

In the IPv6 packet, a header 75 includes a source IPv6 address 77 of 128 bits, a destination IPv6 address 78 of 128 bits, and other header information. In a version field 76, a value indicating that-the packet is an IPv6 packet is set.

In the invention, in the source IPv6 address field 77 of an IP packet transmitted from the IPv4 terminal to the IPv6 terminal, a virtual IPv6 address assigned to the IPv4 terminal is set. In the destination IPv6 address field 78, the IPv6 address of the IPv6 terminal is set. In the source IPv6 address field 77 of an IP packet transmitted from the IPv6 terminal to the IPv4 terminal, the IPv6 address of the IPv6 terminal is set. In the destination IPv6 address field 78, a virtual IPv6 address assigned to the IPv4 terminal is set.

Figure 16:
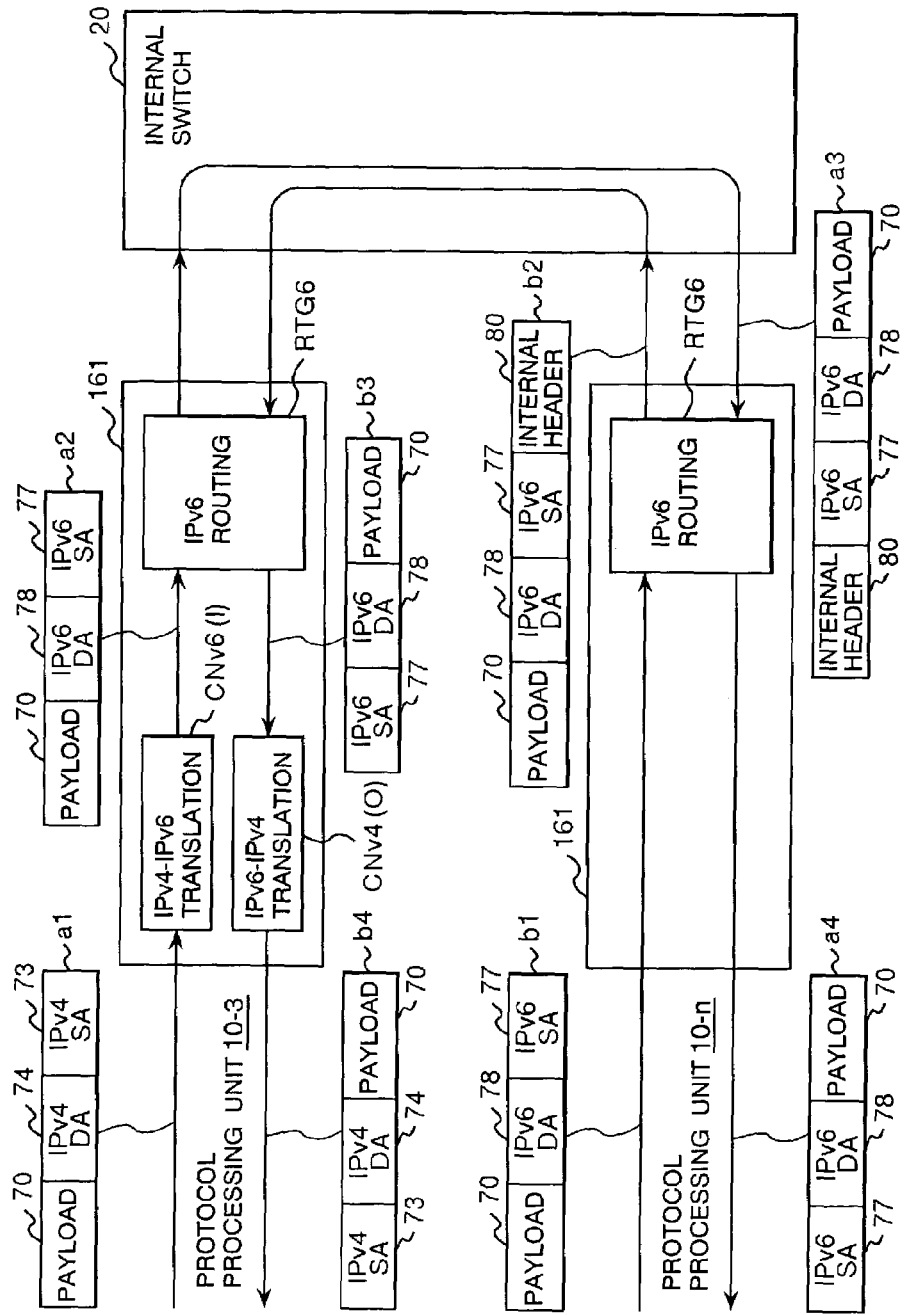
FIG. 16 is a diagram schematically showing the operation of the packet transfer apparatus 1 with attention to a communication path 62 in FIG. 1.

FIG. 16 schematically shows the operation of the packet transfer apparatus 1 with attention paid to the communication path 62 in FIG. 1. As described by referring to FIG. 9, it is assumed that the IPv4-IPv6 address translation processing CNv6(I), the IPv6-IPv4 address translation processing CNv4 (O), and IPv6 routing RT6 are performed by the protocol processing unit 10-3 connected to the IPv4 network NW-3, and only IPv6 routing RT6 is performed by the protocol processing unit 10-n connected to the IPv6 network NW-n.

Figure 17:
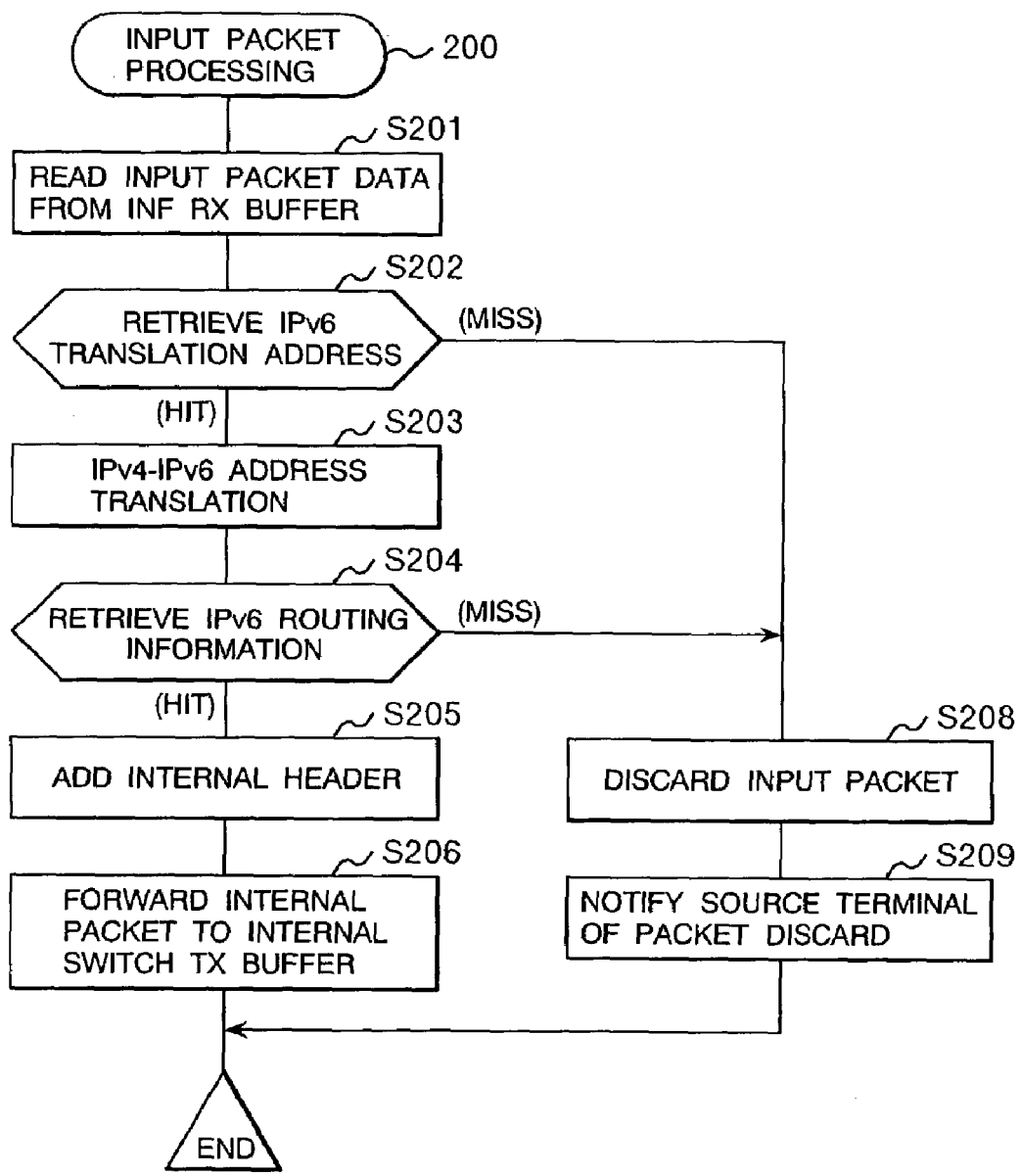
FIG. 17 is a flowchart of an input packet processing routine 200 executed by a protocol processing unit on the IPv4 network side.
Figure 18:
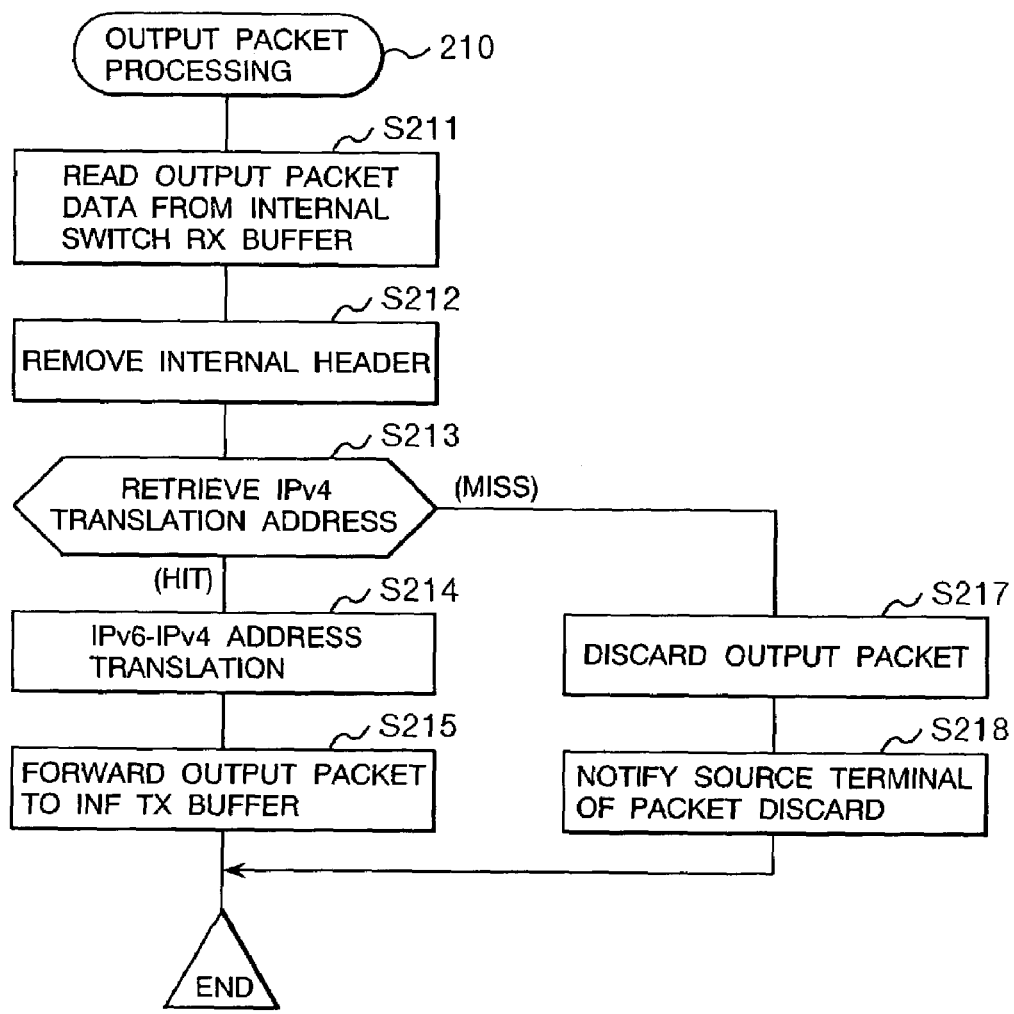
FIG. 18 is a flowchart of an output packet processing routine 210 executed by the protocol processing unit on the IPv4 network side.
Figure 19:
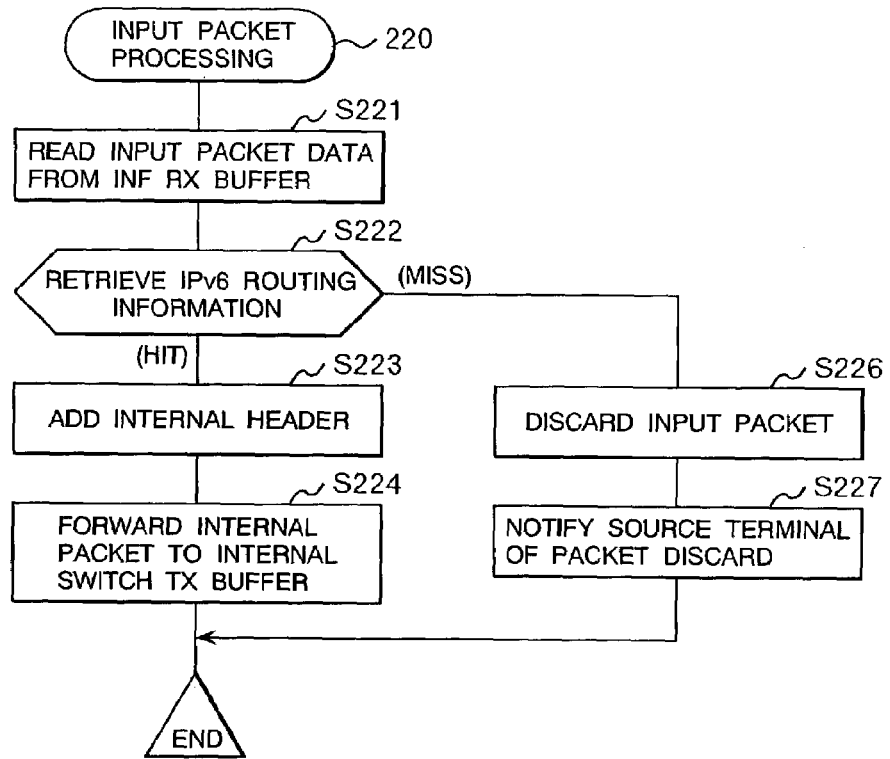
FIG. 19 is a flowchart of an input packet processing routine 220 executed by a protocol processing unit on the IPv6 network side.
Figure 20:
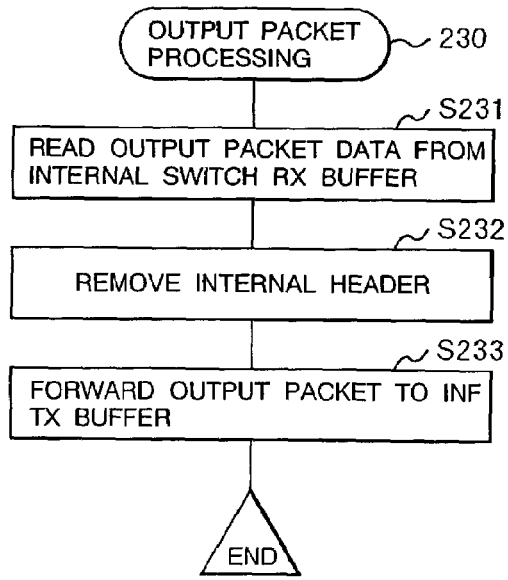
FIG. 20 is a flowchart of an output packet processing routine 230 executed by the protocol processing unit on the IPv6 network side.

FIGS. 17 and 18 are flowcharts of an input packet processing routine 200 and an output packet processing routine 210, respectively, executed by the processor 11 in the protocol processing unit 10-3 on the IPv4 network side. FIGS. 19 and 20 are an input packet processing routine 220 and an output packet processing routine 230, respectively, executed by the processor 11 in the protocol processing unit 10-n on the IPv6 network side.

The routines 200 to 230 construct the packet transfer control routine 161 shown in FIG. 4 and, the IPv4-IPv6 address translation processing CNv6(I), IPv6-IPv4 translation processing CNv4(O), and IPv6 routing RT6 correspond to partial functions of these routines.

First, by referring to FIGS. 16 and 17, an operation of processing an input packet read out from the INF RX buffer 12 by the protocol processing unit 10-3, that is, processing of a user IPv4 packet a1 transmitted from the IPv4 terminal 3c to the IPv6 terminal 3g will be described.

In the input packet processing routine 200, the IPv4 packet a1 is read out from the INF RX buffer 12 (S201), and an entry of which virtual IPv4 address 1662a matches with the destination IP address (virtual IPv4 address [200.10.40.210]) 74 of the packet a1 is retrieved from the IPv4/IPv6 translation table 166 (S202). If the destination IP address [200.10.40.210] is not registered yet in the table 166, the packet a1 is discarded (S208), the source terminal is notified of the discarding of the packet as necessary (S209), and the routine is finished.

If an address translation entry corresponding to the destination IP address [200.10.40.210] is retrieved from the table 166, on the basis of the address translation information indicated by the retrieved entry, the IPv4-IPv6 address translation processing CNv6(I) is executed (S203). Specifically, by translating the source IPv4 address 73 ([200.10.0.10]) of the input packet a1 to the virtual IPv6 address 77 ([4FFF::201]) and translating the destination virtual IPv4 address 74 ([200.10.40.210]) to the destination IPv6 address 78 ([3FFF:: 1]) (S203), the IPv4 packet a1 is translated to an IPv6 packet a2.

Subsequently, from the IPv6 routing table 164, a routing information entry of which network address 1641 matches with the value [3FFF::1] of the destination IPv6 address 78 of the IPv6 packet a2 is retrieved (S204). In the case where the entry having the destination IPv6 address [3FFF::1] is not registered yet in the IPv6 routing table 164, the IPv6 packet a2 is discarded (S208), the source terminal is notified of the discarding of the packet as necessary (S209), and the routine is finished.

In the case where the entry having the destination IPv6 address [3FFF::1] is retrieved from the IPv6 routing table 164, the IPv6 routing processing RTG6 is executed. Specifically, the internal header 80 including routing information indicated by the entry retrieved from the IPv6 routing table 164, for example, the values of the output port number 1643 and the next hop address 1642 is produced and added to the packet a2 (S205). The resultant packet with the internal header is transferred as an IPv6 packet a3 to the internal switch side transmission buffer 14 (S206) and the routine is finished.

The IPv6 packet a3 is transferred to the protocol processing unit 10-n specified by the internal switch port number by the internal switch unit 20 and input to the internal switch side receiving buffer 15 in the protocol processing unit 10-n. In the protocol processing unit 10-n, by an output packet processing routine 230 shown in FIG. 20, the IPv6 packet a3 is readout from the internal switch side receiving buffer 15 (S231) and the IPv6 routing processing RTG6 is executed.

In this case, since the protocol processing unit 10-n is connected to the IPv6 network NW-n, the IPv6 routing processing RTG6 is sufficient to remove the internal header 80 from the IPv6 packet a3 (S232) and transfer the resultant packet as the IPv6 packet a4 to the INF TX buffer 13 (S233). To specify a MAC address of the next node in the IPv6 network NW-n to receive the IPv6 packet a4, in step S233, the INF circuit 30-n may be notified of the next hop address extracted from the internal header 80.

With reference to FIGS. 16 and 19, an operation of processing an input packet read out from the INF RX buffer 12 in the protocol processing unit 10-n, that is, a user IPv6 packet b1 transmitted from the IPv6 terminal 3g to the IPv4 terminal 3c will now be described.

In the input packet processing routine 220, the IPv6 packet b1 is read out from the INF RX buffer 12 (S221) and the IPv6 routing processing RTG6 is executed. Specifically, a routing information entry of which destination network address 1641 matches with the destination address (virtual IPv6 address [4FFF::210]) 78 of the packet b1 is retrieved from the IPv6 routing table 164 (S222). If an entry matching with the destination address ([4FFF::201]) is registered in the IPv6 routing table 164, for example, the internal header 80 including the values of the internal switch port number 1643 and the next hop address 1642 is produced and added to the IPv6 packet b1 (S223). The resultant packet is transferred as an IPv6 packet b2 with the internal header to the internal switch side transmission buffer 14 (S224), and the routine is finished.

In the case where an entry matching with the destination address ([4FFF::201] is not registered yet in the IPv6 routing table 164, the packet b1 is discarded (S226), the source terminal is notified of the discarding of the packet as necessary (S227), and the routine is finished.

The IPv6 packet b2 is transferred to the protocol processing unit 10-3 indicated by the internal header by the internal switch unit 20 and input to the internal switch side receiving buffer 15 in the protocol processing unit 10-3.

In the protocol processing unit 10-3, by the output packet processing routine 210 shown in FIG. 18, the IPv6 packet b2 is read out from the internal switch side receiving buffer 15 (S211) and the IPv6 routing RTG6 and the IPv6-IPv4 translation processing CNv4(O) are executed. The IPv6 routing RTG6 in this case denotes an operation of removing the internal header 80 from the packet b2 (S212), thereby obtaining the resultant as the IPv6 packet b3.

After that, from the IPv4/IPv6 translation table 166, an entry of which virtual IPv6 address 1621b matches with the destination address (virtual IPv6 address [4FFF::201]) of the IPv6 packet b3 is retrieved (S213).

When an entry matched with the destination address ([4FFF::201]) is retrieved, the source IPv6 address ([3FFF::1]) 77 of the packet b3 is translated to the value ([200.10.40.210]) of the virtual IPv4 address 1662a indicated by the entry, the destination address 78 ([4FFF::201]) is translated to the value ([200.10.0.10]) of the IPv4 address 1661a (S214), and the resultant packet is transmitted as an IPv4 packet b4 to the INF TX buffer 13 (S215).

In the case where an entry matched with the destination address ([4FFF::201]) is not registered yet in the IPv4/IPv6 translation table 166, the packet b3 is discarded (S217), as necessary, the packet source terminal is notified of the discarding of the packet (S218), and the routine is finished.

An operation mode selection type packet transfer apparatus will now be described as a second embodiment of the invention.

FIGS. 21 to 24 show examples of layout of address translators in the operation mode selection type packet transfer apparatus 1 according to the invention. By paying attention to the protocol processing unit 10-1 connected to the IPv4 network NW-1 in the communication network shown in FIG. 1, the protocol processing unit 10-2 connected to the IPv4 network NW-2, the protocol processing unit 10-m connected to the IPv6 network NW-m, and the protocol processing unit 10-n connected to the IPv6 network NW-n, modification of the address translation function between IPv4 and IPv6 will be described.

Figure 21:
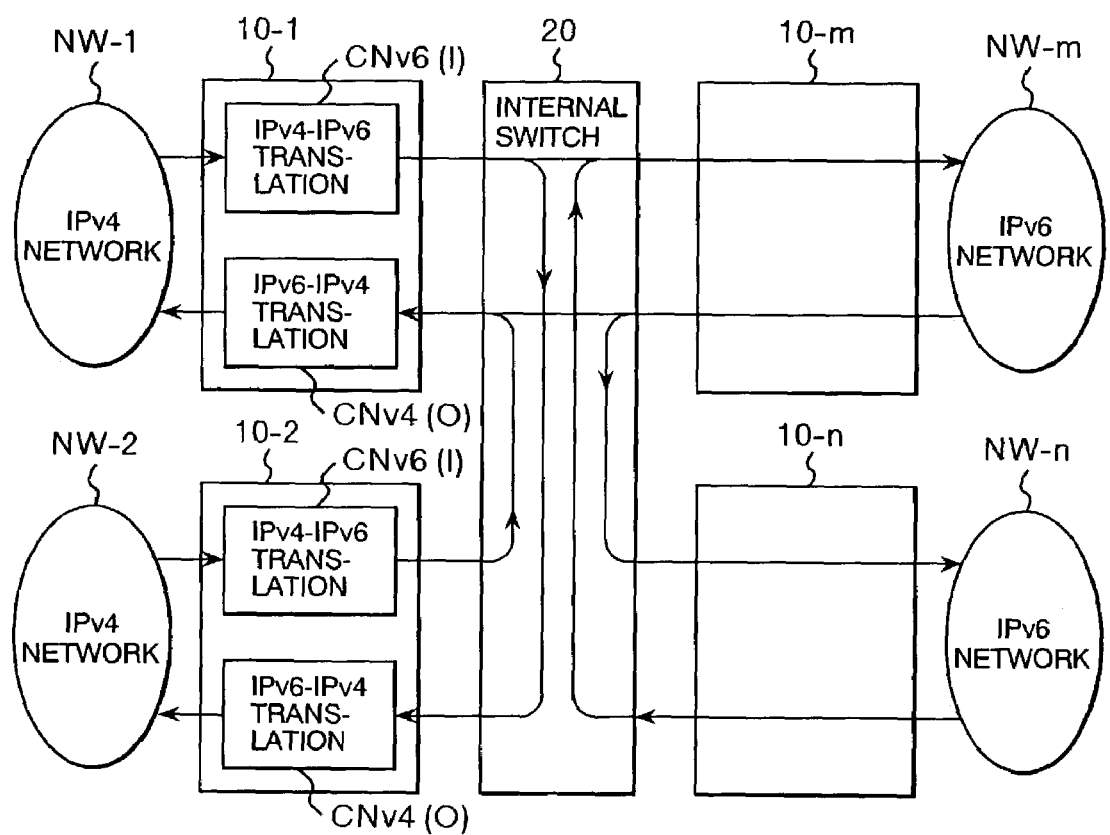
FIG. 21 is a diagram showing a basic layout of address translation functions in an operation mode selection type packet transfer apparatus according to the invention.

FIG. 21 shows the layout of address translators in a basic operation mode of the operation mode selection type packet transfer apparatus 1 according to the invention.

In the basic operation mode, the IPv4-IPv6 address translation processing CNv6(I) is performed on the input side of the protocol processing units 10-1 and 10-2 connected to the IPv4 networks NW-1 and NW-2, and the IPv6-IPv4 address translation processing CNv4(O) is performed on the output side of the protocol processing units 10-1 and 10-2. In this case, all of input packets are switched in the IPv6 packet format in the packet transfer apparatus 1, in the protocol processing unit 10-m connected to the IPv6 network NW-m, it is unnecessary to perform address translation with respect to any of packets transmitted to and received from the IPv4 networks NW-1 and NW-2 and packets transmitted to and received from the IPv6 network NW-n.

Figure 22:
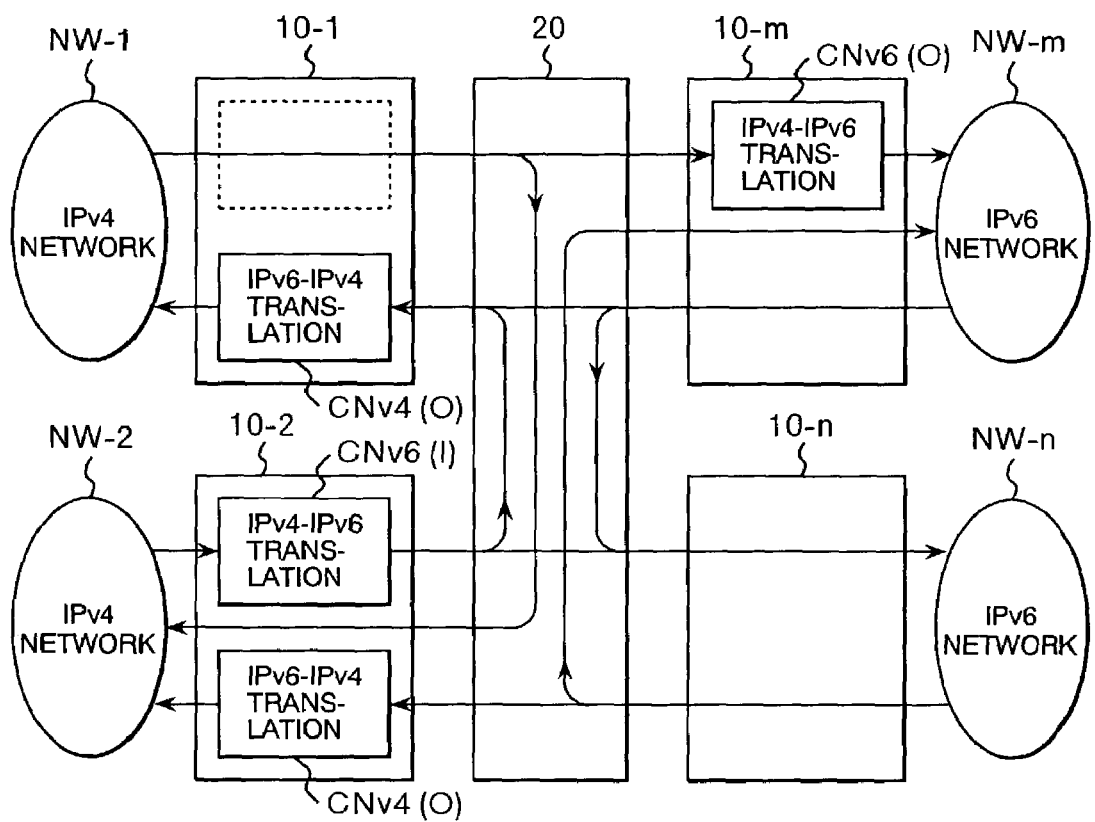
FIG. 22 is a diagram showing a layout of address translation functions in the case where an address translation processing CNv6(I) of a protocol processing unit 10-1 is omitted in the packet transfer apparatus shown in FIG. 21.

FIG. 22 shows the layout of address translators in an operation mode in which the input-side IPv4-IPv6 address translation processing CNv6(I) is omitted in the protocol processing unit 10-1 connected to the IPv4 network NW-1 in order to lessen the load.

In this case, in the packet transfer apparatus, input packets from the IPv4 network NW-1 are switched in the IPv4 packet format and input packets from the IPv4 network NW-2 are switched in the IPv6 packet format. Consequently, in the protocol processing unit 10-m connected to the IPv6 network NW-m, the IPv4-IPv6 address translation processing CNv6 (O) has to be performed on the input packets from the IPv4 network NW-1. Since communication packets between the IPv4 network NW-2 and another IPv6 network NW-n afre in the IPv6 packet format, the address translation is unnecessary for these packets. In the protocol processing unit 10-2 connected to the IPv4 network NW-2, the IPv6-IPv4 address translation processing CNv4(O) needs not to be performed on the received packets from the IPv4 network NW-1, so that the load of address translation is lessened by the amount corresponding to the above processing.

Figure 23:
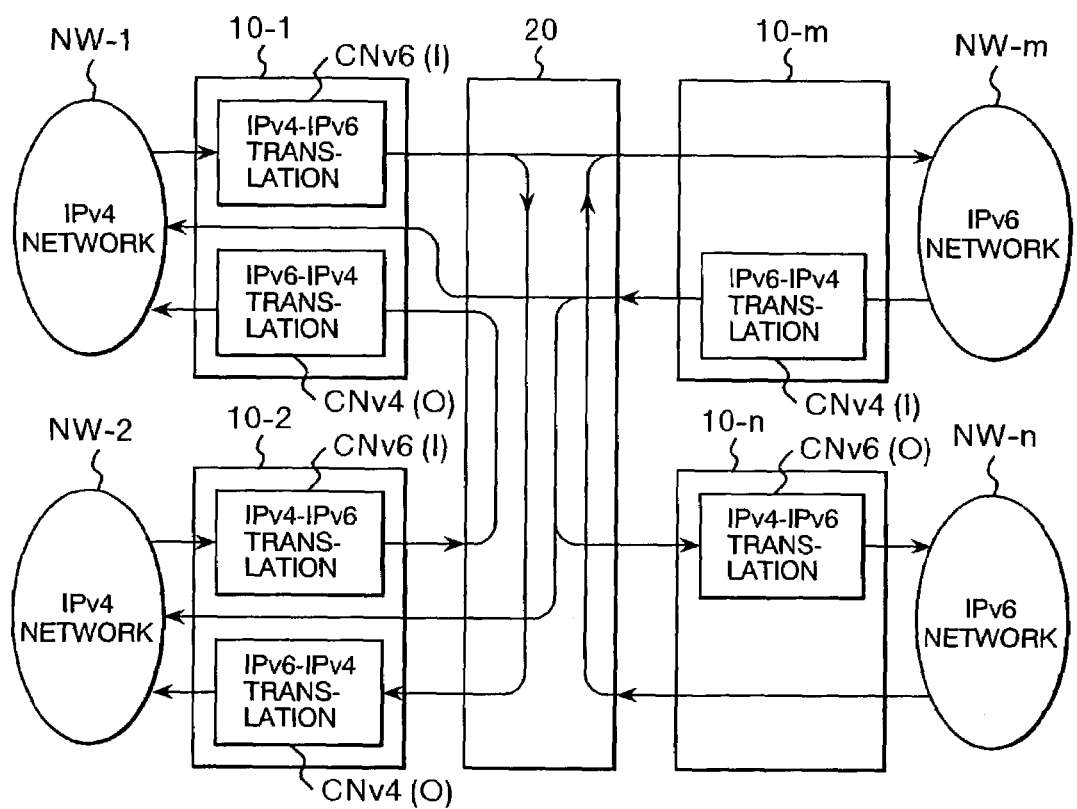
FIG. 23 is a diagram showing a layout of address translation functions in the case where an address translation processing CNv4(I) is added to a protocol processing unit 10-$m$ in the packet transfer apparatus shown in FIG. 21.

FIG. 23 shows the layout of address translators in an operation mode in which the input-side IPv6-IPv4 address translation processing CNv4(I) is executed in the protocol processing unit 10-m connected to the IPv6 network NW-m in order to lessen the load of address translation in the protocol processing units 10-1 and 10-2 connected to the IPv4 network.

In this case, the protocol processing units 10-1 and 10-2 can omit the IPv6-IPv4 address translation processing CNv4 (O) with respect to received packets from the IPv6 network NW-m. On the contrary, the protocol processing unit 10-n connected to the IPv6 network NW-n has to perform the IPv4-IPv6 address translation processing CNv6(O) on received packets from the IPv6 network NW-m.

Figure 24:
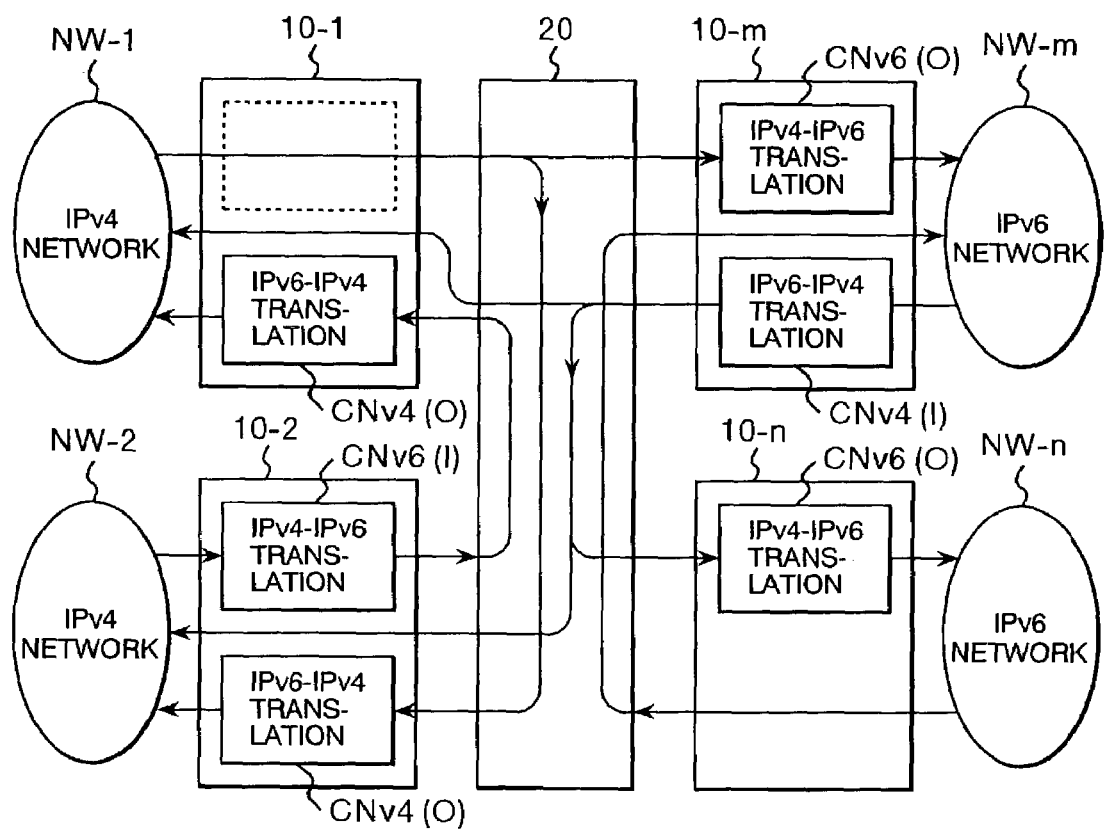
FIG. 24 is a diagram showing a layout of address translation functions in the case where the address translation processing CNv4(I) of the protocol processing unit 10-1 is omitted and the address translation processing CNv4(I) is added to the protocol processing unit 10-$m$ in the packet transfer apparatus shown in FIG. 21.

FIG. 24 shows the layout of address translators in an operation mode in which the input-side IPv4-IPv6 address translation processing CNv6(I) is omitted in the protocol processing unit 10-1 connected to the IPv4 network NW-1 and which executes the input-side IPv6-IPv4 address translation processing CNv4(I) by in the protocol processing unit 10-m connected to the IPv6 network NW-m.

In this case, the protocol processing unit 10-1 can omit the IPv4-IPv6 address translation processing CNv6(I) with respect to received packets from the IPv4 network NW-1 and the output-side IPv6-IPv4 address translation processing CNv4(O) with respect to received packets from the IPv6 network NW-m, so that the load can be lessened more than the operation mode shown in FIG. 22. However, the protocol processing unit 10-m needs the IPv4-IPv6 address translation processing CNv6(O) on received packets from the IPv4 network NW-1, and the load is heavier than that in the operation mode of FIG. 22.

In the operation mode selection type packet transfer apparatus 1 of the invention, to realize the above described switching of the operation mode in the protocol processing unit, each of the protocol processing units 10-i (i=1 to m) is provided with the functions of the address translation processing CNv4(I), CNv6(I), CNv4(O), and CNv6(O). Whether the address translation CNv4(I) or CNv6(I) has to be performed on input packets from the INF RX buffer 12 or not is designated for each protocol processing unit from the control terminal 50 via the control unit 40. Each of the protocol processing units 10-i determines the address version of an output packet read out from the internal switch side receiving buffer 15 and selectively executes the address translation CNv4(O)

or CNv6(O) according to whether the address version of each output packet and the address version of a connection IP network coincide with each other.

Figure 25:
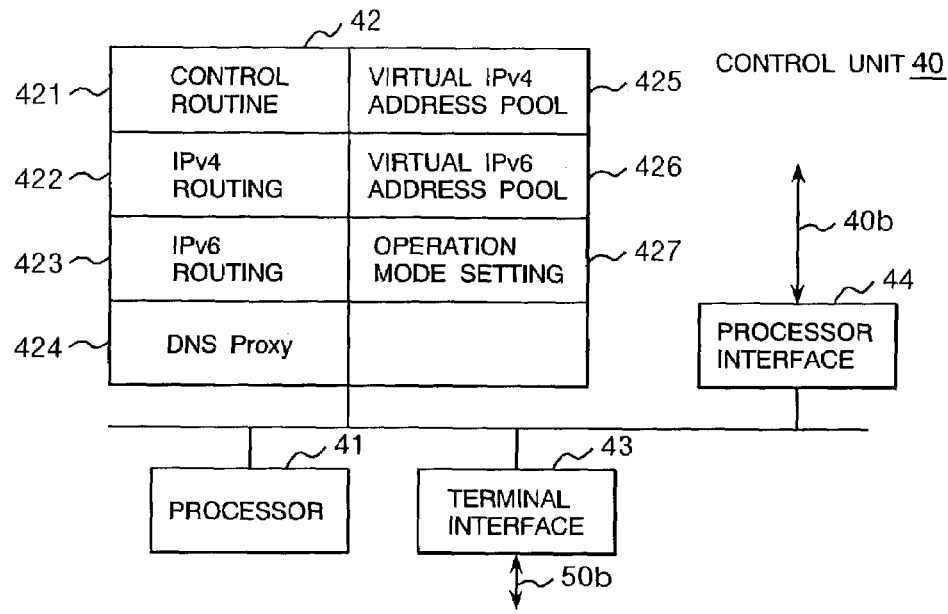
FIG. 25 is a block diagram showing an example of a control unit 40 of the operation mode selection type packet transfer apparatus according to the invention.

FIG. 25 is a block diagram of the control unit 40 of the operation mode selection type packet transfer apparatus 1 according to the invention.

In the control unit 40 of the operation mode selection type packet transfer apparatus 1, not only the programs 421 to 424 shown in FIG. 3 but also an operation mode setting routine 427 are prepared in the memory 42.

Figure 26:
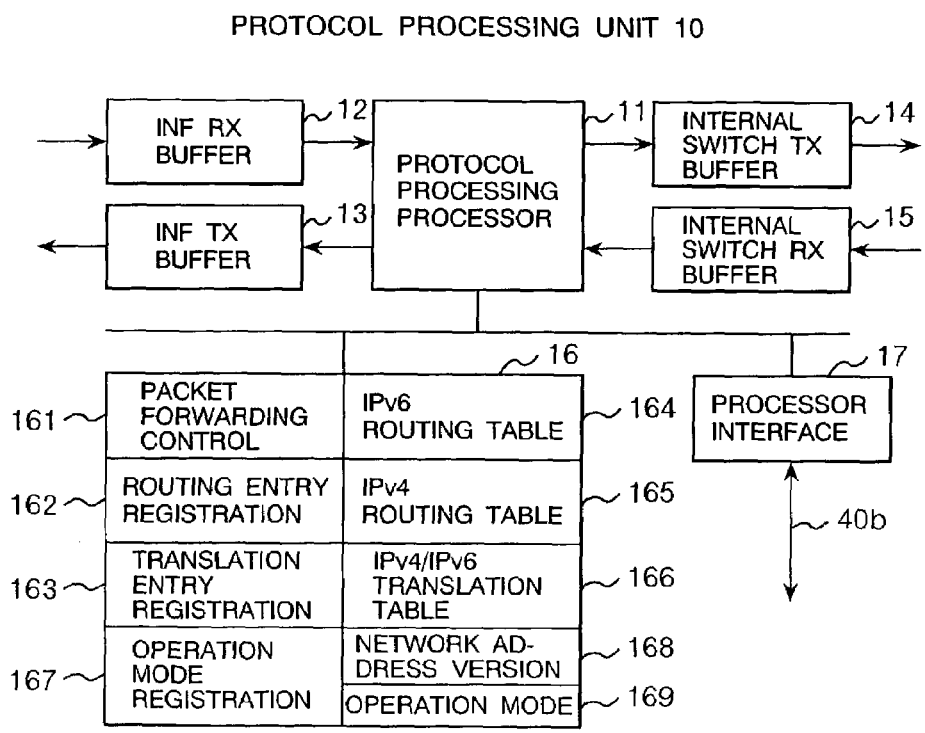
FIG. 26 is a block diagram showing an example of each of the protocol processing units 10 of the operation mode selection type packet transfer apparatus.

FIG. 26 shows the configuration of the protocol processing unit 10 of the operation mode selection type packet transfer apparatus 1.

In the protocol processing unit 10 of the operation mode selection type packet transfer apparatus 1, not only the programs 161 to 163 and the tables 164 to 166 shown in FIG. 4 but also an operation mode registration processing routine 167, an IP network address version memory area 168, and an operation mode memory area 169 are prepared in the memory 16.

For example, when the operator designates an interface ID from the control terminal 50 and enters an IP network address version (IPv4 or IPv6) and a command of setting an operation mode indicating whether the input-side address translation has to be performed or not, the operation mode setting routine 427 and the operation mode registration processing routine 167 set the IP network address version and the address translating operation mode in the IP network address version memory area 168 and the operation mode memory area 169 in the protocol processing unit 10-*j* indicated by the interface ID j, respectively.

Figure 27:
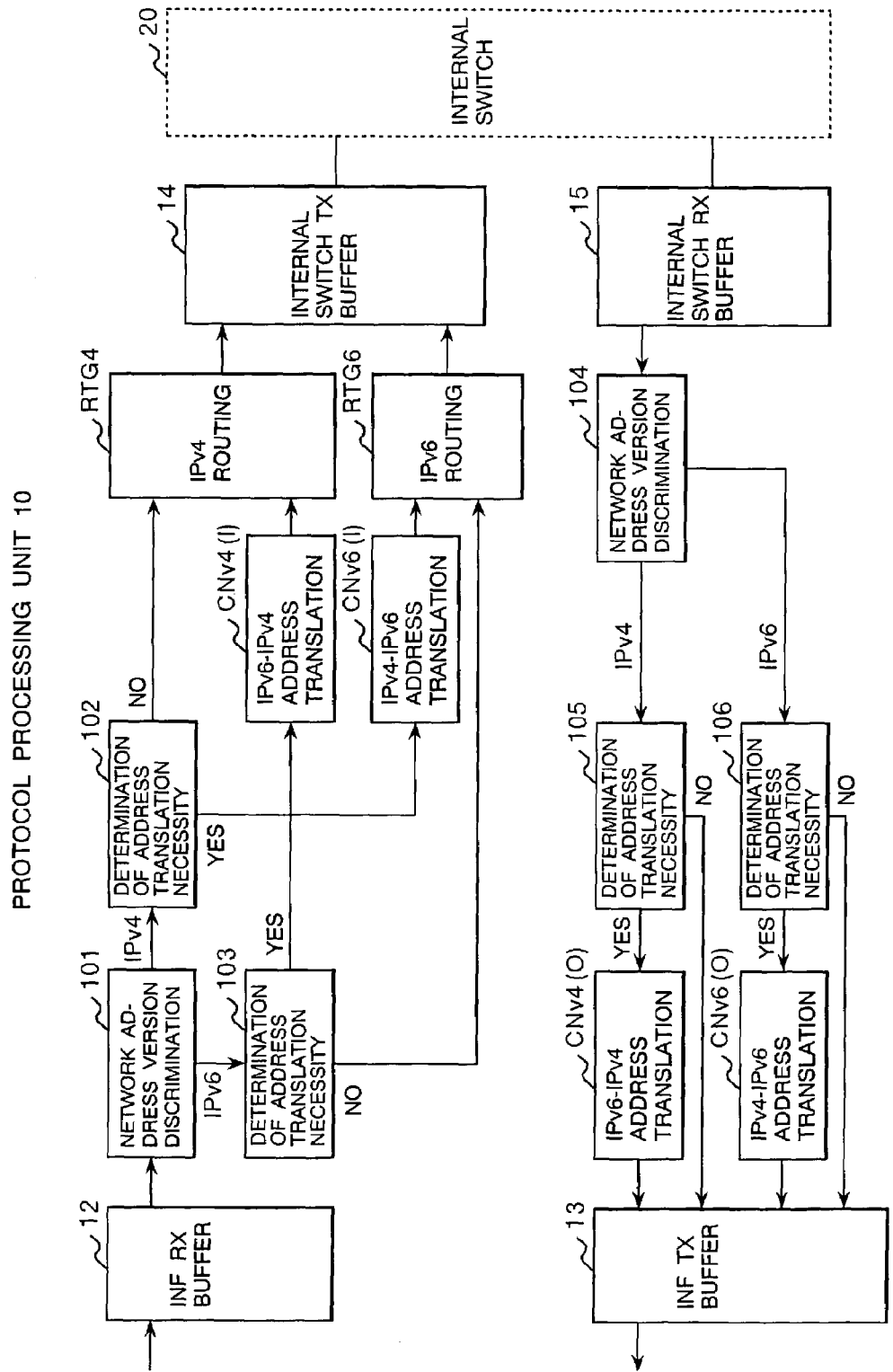
FIG. 27 is a block diagram showing the function of the protocol processing unit 10 of the operation mode selection type packet transfer apparatus.

FIG. 27 is a functional block diagram of the protocol processing unit 10 in the operation mode selection type packet transfer apparatus 1.

Each protocol processing circuit 10 in the operation mode selection type packet transfer apparatus 1 has the functions of the IPv4-IPv6 address translation processing CNv6(I), the IPv4-IPv6 address translation processing CNv6(O), the IPv6-IPv4 address translation processing CNv4(I), IPv6-IPv4 address translation processing CNv4(O), IPv4 routing processing RTG4, and IPv6 routing processing RTG6 and, as means for selectively executing the functions, an input-side connection IP network address version discriminating unit 101, input-side address translation necessity determining units 102 and 103, an output-side connection IP network address version determining unit 104, and output-side address translation necessity determining units 105 and 106.

At the time of transferring an input packet read out from the INF RX buffer 12 to the internal switch side transmission buffer 14, the input-side connection IP network address version discriminating unit 101 determines whether the address version of the input packet read out from the INF RX buffer 12 is the IPv4 address or IPv6 address from the set value of the IP network address version memory area 168. If the input packet is an IPv4 packet, whether address translation on the input side is necessary or not is determined by the address translation necessity determining unit 102. Similarly, if the input packet is an IPv6 packet, whether address translation on the input side is necessary or not is determined by the address translation necessity determining unit 103 The necessity of address translation on the input side is determined by the set value in the operation mode memory area 169.

At the time of transferring an output packet read out from the internal switch side receiving buffer 15 to the INF TX buffer 13, the output-side connection IP network address version determining unit 104 determines whether the address version of the IP network from which the IP packet is transmitted is the IPv4 address or IPv6 address from the set value in the IP network address version memory area 168.

In the case where the address version of the IP network is IPv4, whether the IPv6-IPv4 address translation processing CNv4(O) is necessary or not is determined by the address translation necessity determining unit 105. In the case where the address version of the IP network is IPv6, whether the IPv4-IPv6 address translation processing CNv6(O) is necessary or not is determined by the address translation necessity determining unit 106. The output-side address translation necessity determining units 105 and 106 determine whether the output packet is the IPv4 packet or IPv6 packet from the set value in the version field 72 or 76 at the head of the IP header of each output packet. If the address version of the output packet coincides with the address version of the output-side IP network, the output packet is transmitted as it is. If the address version on the output packet does not coincide with each other, the address translation processing is carried out.

Figure 28:
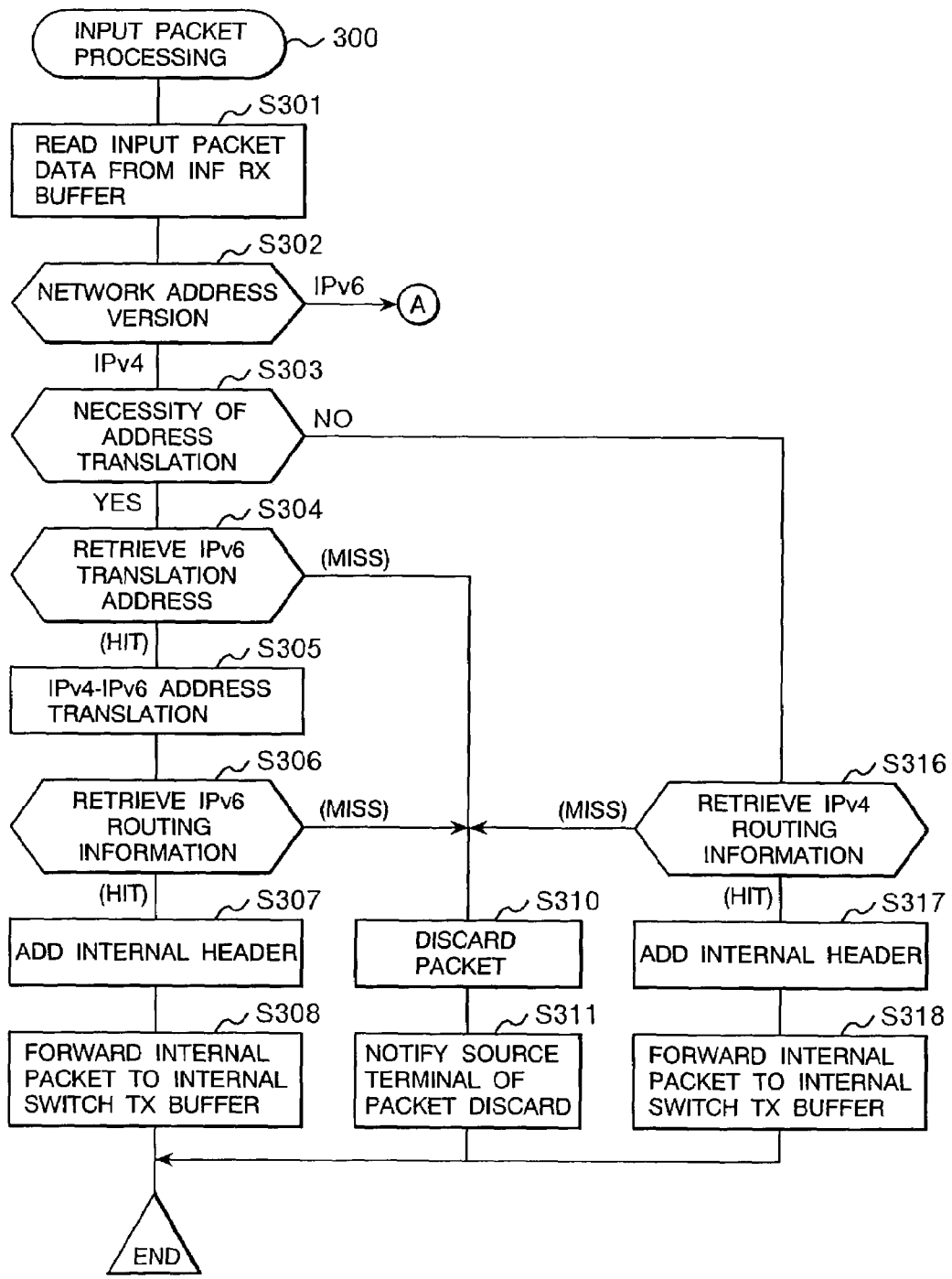
FIG. 28 is a flowchart showing a part of an input packet processing routine 300 executed by the protocol processing unit 10 of the operation mode selection type packet transfer apparatus.
Figure 29:
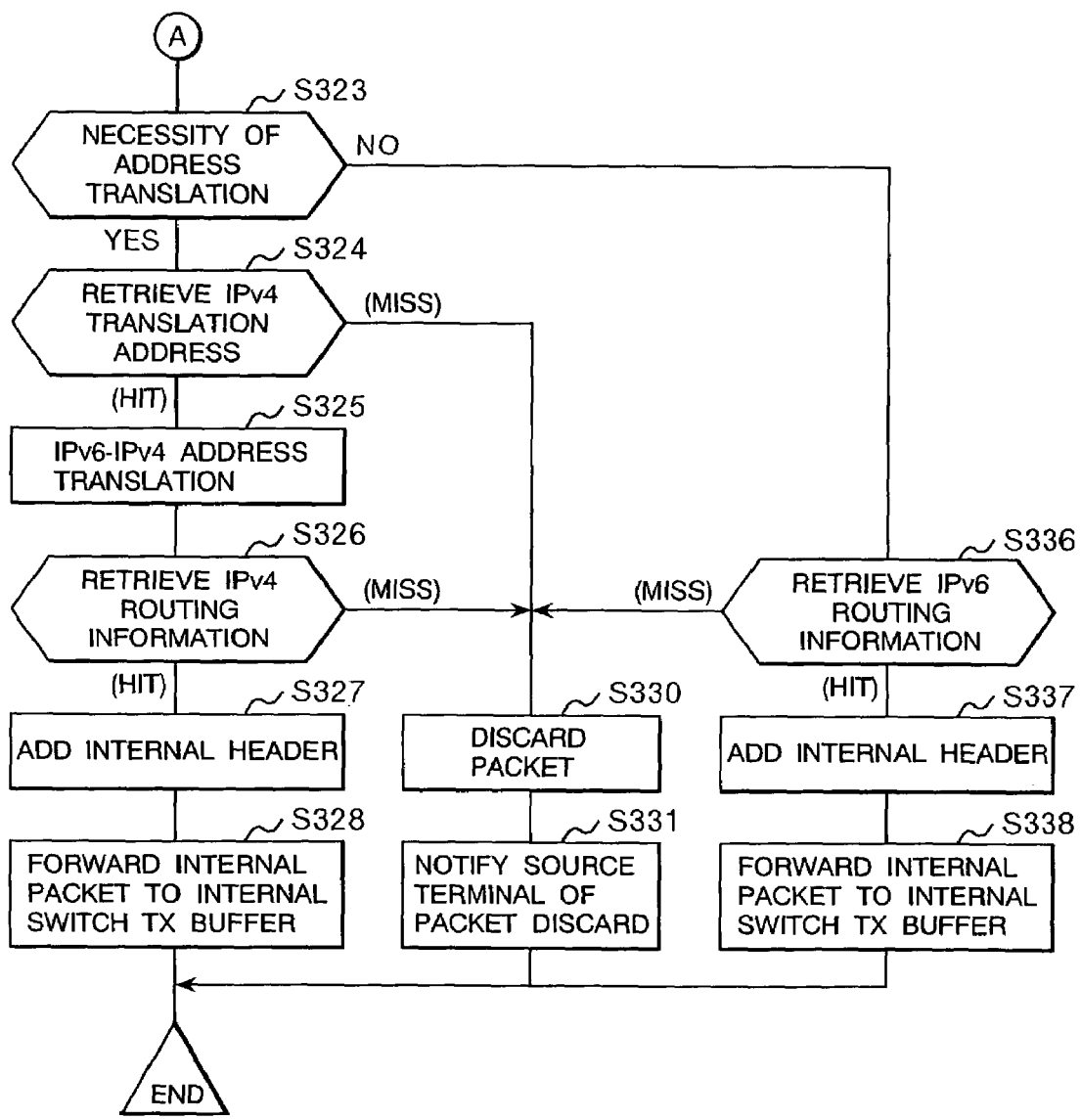
FIG. 29 is a flowchart of the rest of the input packet processing routine 300.
Figure 30:
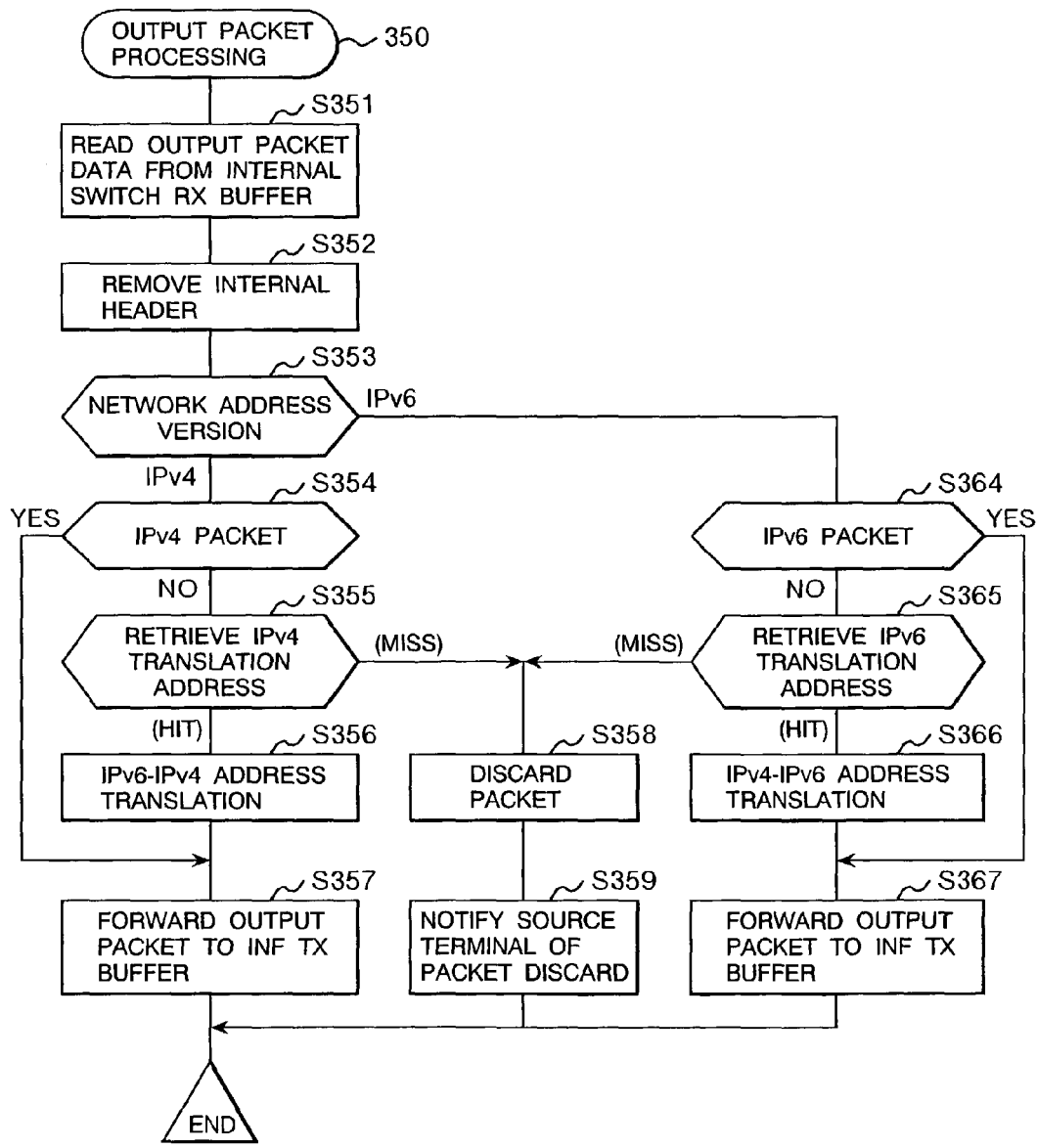
FIG. 30 is a flowchart showing a part of an output packet processing routine 350 executed by the protocol processing unit 10 of the operation mode selection type packet transfer apparatus.

FIGS. 28 and 29 show the flowchart of an input packet processing routine 300 executed by the processor 11 in each protocol processing unit 10 in the operation mode selection type packet transfer apparatus 1. FIG. 30 shows the flowchart of an output packet processing routine 350 executed by the processor 11. These routines correspond to the packet transfer controlling routine 161 of FIG. 23.

In the input packet processing routine 300, as shown in FIG. 28, an input packet is read out from the INF RX buffer 12 (S301) and the address version of a connection IP network is determined by referring to the memory area 168 (S302).

In the case where the address version of the connection IP network is IPv4, the operation mode of the input-side address translation is determined by referring to the memory area 169 (S303). In the case where the operation mode is an address translation execution mode, an entry of which virtual IPv4 address 1662*a* matches with the destination IP address (virtual IPv4 address) of the input packet is retrieved from the IPv4/IPv6 translation information table 166 (S304). If the target information entry is not registered in the table 166, the input packet is discarded (S310), the source terminal is notified of discarding of the packet as necessary (S311), and the routine is finished.

In the case where the target information entry is retrieved from the table 166, the source IPv4 address and the virtual destination IPv4 address of the input packet are replaced with the values of the virtual IPv6 address 1661*b* and the destination IPv6 address 1662*b* indicated by the retrieved entry, thereby translating the input IPv4 packet to an IPv6 packet (S305).

After that, IPv6 routing is executed. Specifically, a routing information entry of which network address 1641 matches with the value of the destination IPv6 address of the IPv6 packet is retrieved from the IPv6 routing table 164 (S306). If the target routing information entry is not registered in the table 164 yet, steps S310 and S311 are executed, and the routine is finished. In the case where the target routing information entry is retrieved, an internal header is produced according to the routing information of the entry and added to the IPv6 packet (S307). The resultant packet is transferred to the internal switch side transmission buffer 14 (S308), and the routine is finished.

When the operation mode is set to a mode in which execution of the input-side address translation is unnecessary in step S303, IPv4 routing is performed. Specifically, a routing information entry of which network address 1651 matches with the value of a destination IPv4 address of the input packet (IPv4 packet) is retrieved from the IPv4 routing table

165 (S316). If the target routing information entry is not registered in the table 165 yet, steps S310 and S311 are executed, and the routine is finished. If the target routing information entry is retrieved, an internal header is produced according to routing information of the entry, and added to an IPv4 packet (S317), the resultant packet is transferred to the internal switch side transmission buffer 14 (S318), and the routine is finished.

In the case where the address version of the connection IP network is IPv6, as shown in FIG. 29, the operation mode of the input-side address translation is determined by referring to the memory area 169 (S323). In the case where an input-side address translation execution mode is designated as the operation mode, an entry of which virtual IPv6 address 1661*b* matches with the destination IP address (virtual IPv6 address) of the input packet is retrieved from the IPv4/IPv6 translation information table 166 (S324). If the target information entry is not registered in the table 166 yet, the input packet is discarded (S330), the packet source terminal is notified of the discarding of the packet as necessary (S331), and the routine is finished.

In the case where the target information entry is retrieved from the table 166, the source IPv6 address and the virtual destination IPv6 address of the input packet are replaced with the values of the virtual IPv4 address 1662*a* and the destination IPv4 address 1661*a* indicated by the retrieved entry, thereby translating the input IPv6 packet to the IPv4 packet (S325).

After that, IPv4 routing is executed. Specifically, a routing information entry of which destination network address 1651 matches with the value of the destination IPv4 address of the IPv4 packet is retrieved from the IPv4 routing table 165 (S326). If the target routing information entry is not registered in the table 165 yet, steps S330 and S331 are executed, and the routine is finished. In the case where the target routing information entry is retrieved, an internal header is produced according to the routing information of the entry and added to the IPv4 packet (S327). The resultant packet is transferred to the internal switch side transmission buffer 14 (S328), and the routine is finished.

When the operation mode is set to a mode in which execution of the input-side address translation is unnecessary in step S322, IPv6 routing is performed. Specifically, a routing information entry of which destination network address 1641 matches with the value of a destination IPv6 address of the input packet (IPv6 packet) is retrieved from the IPv6 routing table 164 (S336). If the target routing information entry is not registered in the table 164 yet, steps S330 and S331 are executed, and the routine is finished. If the target routing information entry is retrieved, an internal header is produced according to routing information of the entry, and added to an IPv6 packet (S337), the resultant packet is transferred to the internal switch side transmission buffer 14 (S338), and the routine is finished.

In the output packet processing routine 350, as shown in FIG. 30, an output packet is read out from the internal switch side receiving buffer 15 (S351) and the internal header is removed (S352). By referring to the memory area 168, the address version of the connection IP network is determined (S353).

In the case where the address version of the connection IP network is IPv4, the IP header of an output packet is referred to and whether the output packet is an IPv4 packet or not is determined from the set value in the version field (S354). If the output packet is an IPv4 packet, since address translation on the output side is unnecessary, the output packet is transferred to the INF TX buffer 13 (S357) and the routine is finished.

In the case where the output packet is an IPv6 packet, an entry of which virtual IPv6 address 1661*b* matches with the destination IP address (virtual IPv6 address) of the output packet is retrieved from the IPv4/IPv6 translation table 166 (S355). If the target routing information entry is not registered in the table 166 yet, the packet is discarded (S358), the packet transmission source is notified of the discarding of the packet as necessary (S359), and the routine is finished.

In the case where the target information entry is retrieved from the table 166, the source IPv6 address and the destination IPv6 address (virtual IPv6 address) of the output packet are replaced with the values of the virtual IPv4 address 1662*a* and the destination IPv4 address 1661*a* indicated by the retrieved entry, respectively (S356), the address-translated IPv4 packet is transferred to the INF TX buffer 13 (S357), and the routine is finished.

In the case where the address system of the connection IP network is an IPv6 address, by referring to the IP header of the output packet, whether the output packet is an IPv6 packet or not is determined from a set value in the version field (S364). In the case where the output packet is an IPv6 packet, since address translation on the output side is unnecessary, the output packet is transferred to the INF TX buffer 13 (S367), and the routine is finished.

In the case where the output packet is an IPv4 packet, an entry of which virtual IPv4 address 1662*a* matches with the destination IP address (virtual IPv4 address) of the output packet is retrieved from the IPv4/IPv6 translation table 166 (S365). If the target information entry is not registered in the table 166 yet, steps S358 and S359 are executed, and the routine is finished.

In the case where the target information entry is retrieved from the table 166, the source IPv4 address and the destination IPv4 address (virtual IPv4 address) of the output packet are replaced with values of the virtual IPv6 address 1661*b* and the destination IPv6 address 1662*b* indicated by the retrieved entry, respectively (S366), the address translated IPv6 packet is transferred to the INF TX buffer 13 (S367) and the routine is finished.

Although the foregoing embodiment is based on the precondition that each of the protocol processing units 10-*i* (i=1 to n) has four kinds of address translating functions (CNv6(I), CNv6(O), CNv4(I), and CNv4(O)), it is also possible to provide a protocol processing unit dedicated to the IPv4 network with only the functions of the IPv4-IPv6 address translation processing CNv6(I) and the IPv6-IPv4 address translation processing CNv4(O) and provide a common protocol processing unit which can be connected to any of the IPv4 network and the IPv6 network with the four kinds of address translating functions. In the case where all of IP networks accommodated in the packet transfer apparatus are either IPv4 networks or IPv6 networks, it is sufficient to set all of the protocol processing units to the address translation omission mode.

Although the operation mode in each protocol processing unit is set by an instruction from the control terminal 50 in the foregoing embodiments, the operation mode may be set by, for example, operating a mode switch provided for each protocol processing unit. It is also possible to store operation modes of all of line interfaces in the control unit 40 and automatically switch the operation mode in predetermined cycles according to a result of monitoring a traffic volume of each line interface in the following manner as an example. In a line interface of which average traffic volume of input packets in a certain period exceeds an upper limit threshold, the input-side address translation processing is omitted and, in a line interface of which average traffic volume is lower than a lower limit threshold, the input-side address translation processing is executed.

As obviously understood from the foregoing embodiments, the packet transfer apparatus of the invention can flexibly respond to a structural change in an IP network configuration by employing the IPv6 routing. According to the packet transfer apparatus of the operation mode selection type of the invention, the load amount of address translation processing can be controlled in accordance with a change in a traffic volume in each connection IP network. Consequently, the packet transfer apparatus can effectively serve as an address translator for an IP network of which communication amount and configuration are rapidly changing.

What is claimed is:

1. A packet transfer apparatus comprising:
a plurality of protocol processing units, each of which is connected to an IP (Internet Protocol) network and provided with a function of converting each of IP packets received from the IP network into an internal packet having an internal header with internal routing information and extracting an IP packet from each of internal packets transferred from the other protocol processing units to output the IP packet to the IP network; and
a switch for switching internal packets including IPv4 packets, each having an IPv4 address, and internal packets including IPv6 packets, each having an IPv6 address, among said protocol processing units based on the internal routing information of each internal packet,
wherein each of said protocol processing units connected to an IPv4 network comprises:
input-side address translating means for translating the IPv4 address of an input packet received from the IPv4 network to an IPv6 address so that the address-translated IPv6 packet is supplied to said switch after being converted into an internal packet;
means for storing operation mode designation information indicating whether execution of address translation by said input-side address translating means is necessary or not;
packet transfer control means for transferring input packets received from said IPv4 network either in an IPv6 routing mode in which each of the input packets is supplied to said switch after translating the IP address of the input packet to an IPv6 address or in an IPv4 routing mode in which each of the input packets is supplied to said switch without performing address translation, in accordance with said operation mode designation information;
output-side address translating means for translating, when an internal packet including an output packet having an IPv6 address is received from said switch, the IPv6 address of the output packet extracted from the internal packet to an IPv4 address so that the address-translated IPv4 packet is transferred to said IPv4 network; and
control means having a memory for indicating a network address version of the IP network connected to the protocol processing unit,
wherein said control means determines the address version of the output packet extracted from the internal packet received from said switch by referring to an IP header of the output packet and transfers the output packet to said IPv4 network without going through said output-side address translating means when the output packet has an IP address version matched with the network address version indicated by said memory.

2. The packet transfer apparatus according to claim 1, wherein at least one of said plurality of protocol processing units is connected to an IPv6 network on which IP packets each having an IPv6 address are transferred, and the protocol processing unit includes:
output-side address translating means for translating, when an internal packet including an output packet having an IPv4 address is received from said switch, the IPv4 address of the output packet extracted from the internal packet to an IPv6 address so that the address translated IPv6 packet is transferred to said IPv6 network; and
means for determining the address version of the output packet extracted from the internal packet received from said switch by referring to an IP header of the output packet and transferring the output packet to said IPv6 network not through said output-side address translating means when an internal packet including an output packet having an IPv6 address is received from said switch.

3. The packet transfer apparatus according to claim 2, wherein said protocol processing unit connected to said IPv6 network further comprises:
input-side address translating means for translating the IPv6 address of an input packet extracted from the internal packet received from said IPv6 network to an IPv4 address and supplying the address translated packet to said switch;
means for storing operation mode designation information indicating whether execution of address translation by said input-side address translating means is necessary or not; and
packet transfer control means for transferring internal packets including input IPv6 packets received from said IPv6 network either in an IPv4 routing mode in which the input IPv6 packets are supplied to said switch after translating the IPv6 address of each of said input packets to an IPv4 address or an IPv6 routing mode of supplying the input IPv6 packets to said switch without performing address translation, in accordance with said operation mode designation information.

4. The packet transfer apparatus according to claim 2, wherein each said protocol processing unit further includes:
means for converting each of input packets to be supplied to said switch into an internal packet by adding internal routing information determined in accordance with a destination address of the input packet; and
means for converting each internal packet received from said switch into an output packet by eliminating the internal routing information from the internal packet,
wherein said switch transfers each internal packet supplied from each of said protocol processing units to one of the other protocol processing units specified in accordance with the internal routing information of the internal packet.

5. A packet transfer apparatus comprising:
a plurality of protocol processing units, each of which is connected to an IP (Internet Protocol) network and provided with a function of converting each of IP packets received from the IP network into an internal packet having an internal header with internal routing information and extracting an IP packet from each of internal packets transferred from the other protocol processing units to output the IP packet to the IP network; and
a switch for switching internal packets including IPv4 packets, each having an IPv4 address, and internal packets including IPv6 packets each having an IPv6 address, among said protocol processing units based on the internal routing information of each internal packet,
wherein each of the protocol processing units connected to an IPv4 network comprises:
first input-side address translating means for translating the IPv4 address of an input packet received from said IPv4 network to an IPv6 address so that the address translated IPv6 packet is supplied to said switch after being converted into an internal packet;
first output-side address translating means for translating, when an internal packet including an output packet having an IPv6 address is received from said switch, the IPv6 address of the output packet extracted from the internal packet to an IPv4 address so that the address translated IPv4 packet is transferred to said IPv4 network;
a first operation mode memory for indicating whether execution of address translation by said first input-side address translating means is necessary or not; and
first operation mode switching means for transferring input packets each having an IPv4 address to said switch without performing address translation by said first input-side address translating means when the first operation mode memory indicates that execution of address translation by said first input-side address translating means is not necessary, and
wherein each of the protocol processing units connected to an IPv6 network comprises:
second input-side address translating means for translating the IPv6 address of an input packet received from said IPv6 network to an IPv4 address so that the address translated IPv4 packet is supplied to said switch after being converted into an internal packet;
second output-side address translating means for translating, when an internal packet including an output packet having an IPv4 address is received from said switch, the IPv4 address of the output packet extracted from the internal packet to an IPv6address so that the address-translated packet is transferred to said IPv6 network;
a second operation mode memory for indicating whether execution of address translation by said second input-side address translating means is necessary or not; and
second operation mode switching means for transferring input packets each having an IPv6address to said switch without performing address translation by said second input-side address translating means when the second operation mode memory indicates that execution of address translation by said second input-side address translating means is not necessary.

6. The packet transfer apparatus according to claim 5, wherein each said protocol processing unit further includes:
means for converting each input packet to be supplied to said switch into an internal packet by adding internal routing information determined in accordance with a destination address of the input packet; and
means for converting each internal packet received from said switch into an output packet by eliminating the internal routing information from the internal packet,
wherein said switch transfers each said internal packet supplied from each said protocol processing unit to one of the other said protocol processing units specified in accordance with the internal routing information of the internal packet.

7. A packet transfer apparatus comprising:
a plurality of protocol processing units, each of which is connected to an IP (Internet Protocol) network and provided with a function of converting each of IP packets received from the IP network into an internal packet having an internal header with internal routing information and extracting an IP packet from each of internal packets transferred from the other protocol processing units to output the IP packet to the IP network; and
a switch for switching internal packets including IPv4 packets, each having an IPv4 address, and internal packets including IPv6 packets, each having an IPv6 address, among said protocol processing units based on the internal routing information of each internal packet,
wherein each of said protocol processing units comprises:
first input-side address translating means for translating an IPv4 address of an input packet received from an IP network to an IPv6 address so that the address-translated IPv6 packet is supplied to said switch after being converted into an internal packet;
second input-side address translating means for translating an IPv6 address of an input packet received from the IP network into an IPv4 address so that the address-translated IPv4 packet is supplied to said switch after being converted into an internal packet;
a routing unit for adding internal routing information to the input packet received from the IP network or to the input packet whose IP address has been translated by said first or second input-side address translating means and supplying the packet with the internal routing information to said switch as an internal packet;
means for converting an internal packet received from said switch into an output packet by eliminating internal routing information from the received internal packet;
first output-side address translating means for translating, when an internal packet including the output packet is an IPv6 packet having an IPv6 address, the IPv6 address of the output packet extracted from the internal packet to an IPv4 address so that the address translated IPv4 packet is transferred to the IP network;
second output-side address translating means for translating, when an internal packet including the output packet is an IPv4 packet having an IPv4 address, the IPv4 address of the output packet extracted from the internal packet to an IPv6 address so that the address translated IPv6 packet is transferred to the IP network;
third means for determining the address version of the output packet extracted from the internal packet received from said switch by referring to an IP header of the output packet and transferring the output packet to the IP network without performing address translation on the output packet if the IP address of the output packet has the same protocol version as that of the IP network; and
control means for selectively operating said first input-side address translating means, said second input-side address translating means, said first output-side address translating means, said second output-side address translating means and said third means.

8. The packet transfer apparatus according to claim 7, wherein said control means controls execution of address translation by said first and second input-side address translating means in accordance with a control instruction from the outside.

9. The packet transfer apparatus according to claim 7, wherein said control means has a memory for indicating a network address version of the IP network connected to said protocol processing unit and controls execution of address translation by said first and second output-side address translating means so as to adapt the address version of each output packet to the network address version indicated by the memory.

10. The packet transfer apparatus according to claim 8, wherein said control means has a memory for indicating a network address version of the IP network connected to said protocol processing unit and controls execution of address translation by said first and second output-side address translating means so as to adapt the address version of each output packet to the network address version indicated by the memory.

\* \* \* \* \*